(12) United States Patent
Hu et al.

(10) Patent No.: US 10,832,718 B2
(45) Date of Patent: Nov. 10, 2020

(54) SLIDER GAS-BEARING SURFACE DESIGNS WITH LEADING-EDGE POCKETS

(71) Applicant: Western Digital Technologies, Inc., San Jose, CA (US)

(72) Inventors: Yong Hu, San Ramon, CA (US); Weidong Huang, Palo Alto, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/830,612

(22) Filed: Mar. 26, 2020

(65) Prior Publication Data

US 2020/0227079 A1 Jul. 16, 2020

Related U.S. Application Data

(60) Continuation of application No. 16/443,267, filed on Jun. 17, 2019, which is a division of application No. 15/846,168, filed on Dec. 18, 2017, now abandoned.

(51) Int. Cl.
| | |
|---|---|
| *G11B 5/60* | (2006.01) |
| *G11B 21/21* | (2006.01) |
| *G11B 5/187* | (2006.01) |

(52) U.S. Cl.
CPC .......... *G11B 5/6082* (2013.01); *G11B 5/1871* (2013.01); *G11B 21/21* (2013.01)

(58) Field of Classification Search
None
See application file for complete search history.

(56) References Cited

U.S. PATENT DOCUMENTS

| | | | |
|---|---|---|---|
| 4,218,715 A | 8/1980 | Garnier | |
| 4,644,641 A | 2/1987 | Verdone | |
| 4,670,806 A * | 6/1987 | Ghose | G11B 5/60 360/235.7 |
| 4,673,996 A * | 6/1987 | White | G11B 5/6005 360/236.7 |
| 4,870,519 A * | 9/1989 | White | G11B 5/6005 360/236.7 |
| 4,996,614 A | 2/1991 | Okutsu | |
| 5,062,017 A | 10/1991 | Strom et al. | |
| 5,490,025 A | 2/1996 | Dorius et al. | |
| 5,515,219 A | 5/1996 | Ihrke et al. | |
| 5,644,449 A * | 7/1997 | Hayakawa et al. | G11B 5/6005 360/234.2 |
| 5,650,892 A | 7/1997 | Dorius et al. | |
| 5,721,650 A | 2/1998 | Crane et al. | |
| 5,926,344 A * | 7/1999 | Kimura | G11B 5/6005 360/236.7 |
| 6,411,468 B1 | 6/2002 | Park et al. | |

(Continued)

*Primary Examiner* — Craig A. Renner
(74) *Attorney, Agent, or Firm* — Jacobsen IP Law; Krista S. Jacobsen

(57) ABSTRACT

Disclosed herein are sliders that include at least one leading-edge pocket, data storage devices comprising such sliders, and methods of manufacturing such sliders. The at least one leading-edge pocket increases the amount of gas flowing into the leading edge area of the ABS, which can improve the performance of the slider in low-pressure environments, such as sealed helium data storage devices. The at least one leading-edge pocket can have a variety of shapes, sizes, and features to achieve the desired slider performance (e.g., fly height, stability, etc.) in low-pressure environments.

19 Claims, 14 Drawing Sheets

(56) References Cited

U.S. PATENT DOCUMENTS

| | | |
|---|---|---|
| 6,462,909 B1 | 10/2002 | Boutaghou et al. |
| 6,477,012 B1 | 11/2002 | Park et al. |
| 6,483,667 B1 * | 11/2002 | Berg et al. .......... G11B 5/6082 |
| | | 360/235.6 |
| 6,501,621 B1 | 12/2002 | Griffin et al. |
| 6,515,831 B1 | 2/2003 | Sannino et al. |
| 6,674,612 B2 | 1/2004 | Boutaghou et al. |
| 6,744,601 B2 | 6/2004 | Brand et al. |
| 6,980,399 B2 | 12/2005 | Rajakumar et al. |
| 6,999,282 B2 | 2/2006 | Rao |
| 2003/0002218 A1 | 1/2003 | Koishi |
| 2005/0280943 A1 * | 12/2005 | Inoue et al. ......... G11B 5/6082 |
| | | 360/235.6 |
| 2007/0030597 A1 | 2/2007 | Watanabe et al. |

* cited by examiner

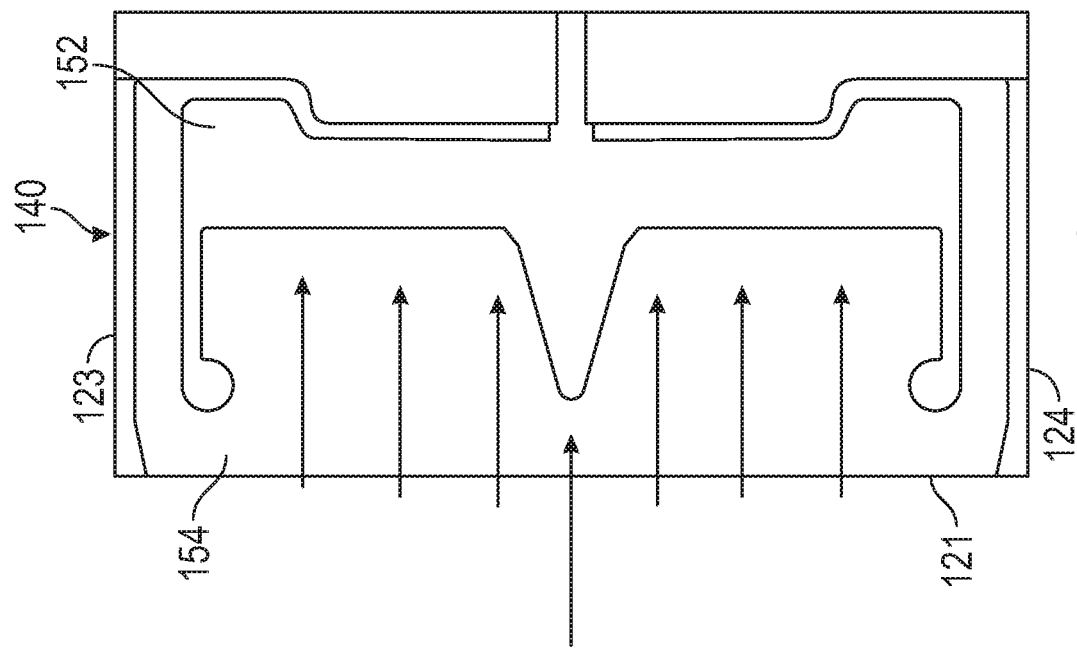
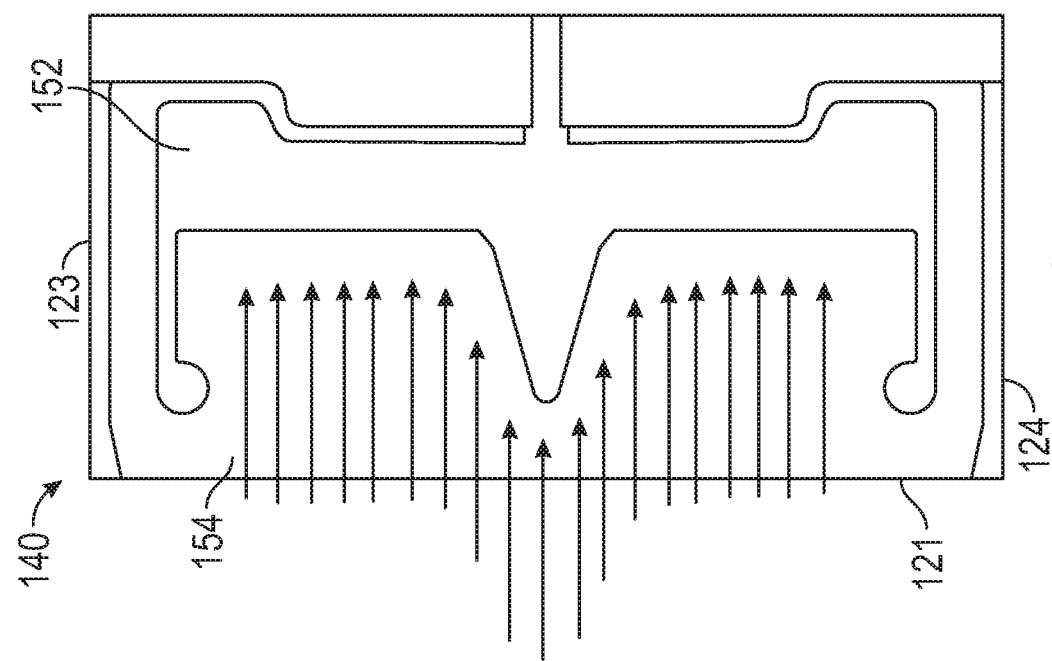

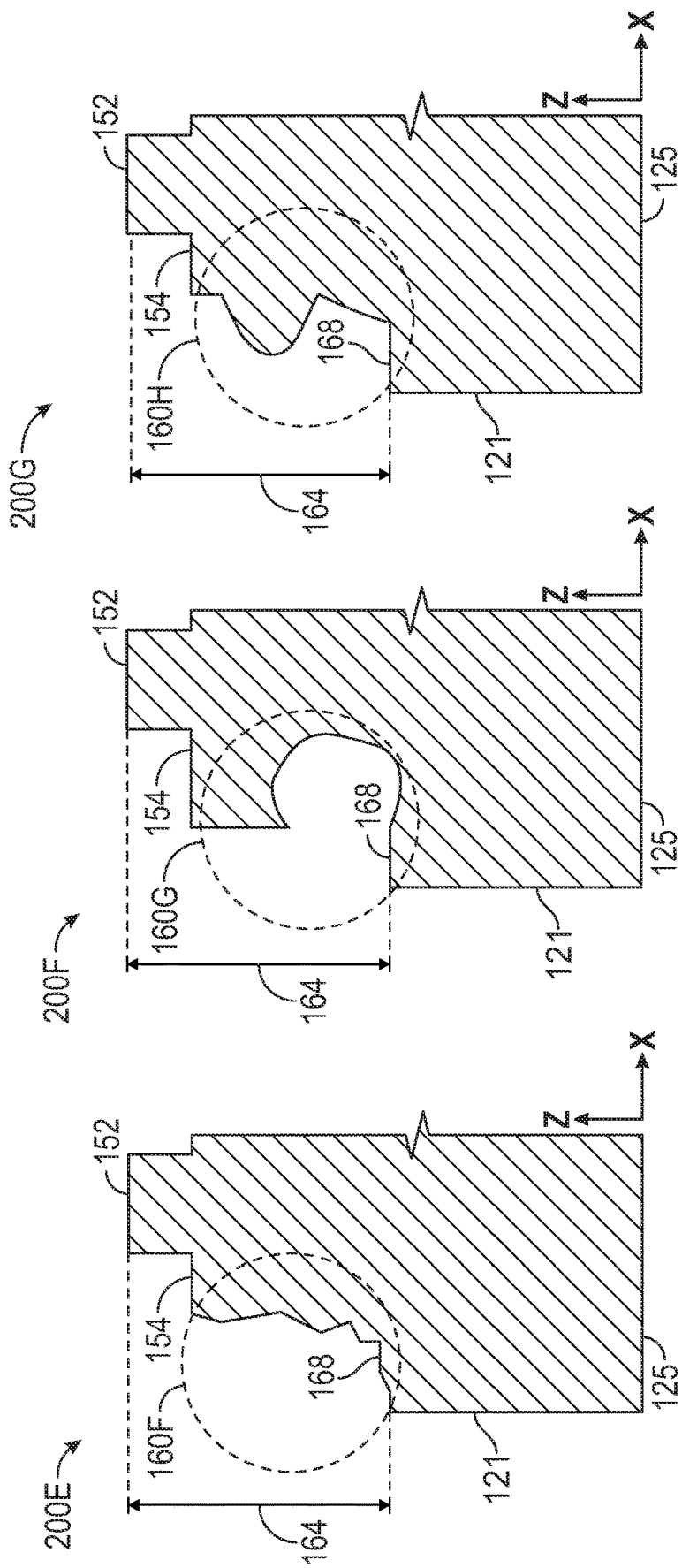

SLIDER GAS-BEARING SURFACE DESIGNS WITH LEADING-EDGE POCKETS

CROSS-REFERENCE TO RELATED APPLICATIONS

This application is a continuation of U.S. patent application Ser. No. 16/443,267, filed Jun. 17, 2019 and entitled ""SLIDER GAS-BEARING SURFACE DESIGNS WITH LEADING-EDGE POCKETS," which is a divisional of U.S. patent application Ser. No. 15/846,168, filed Dec. 18, 2017 and entitled "SLIDER GAS-BEARING SURFACE DESIGNS WITH LEADING-EDGE POCKETS." U.S. patent application Ser. Nos. 15/846,168 and 16/443,267 are hereby incorporated by reference in their entireties for all purposes.

BACKGROUND

Data storage systems are used to store large amounts of information. A data storage system typically includes a read/write transducer for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports a head that includes the read/write transducer. The slider provides mechanical support for the head and the electrical connections between the head and the rest of the data storage system.

When the data storage system is in operation, the slider floats a small distance above the recording medium (i.e., a hard disk in a hard disk drive), which rotates at high speeds. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface (ABS) that faces the medium. The ABS is designed to generate an air-bearing force that counteracts a preload bias that pushes the slider toward the medium. The ABS causes the slider to fly above and out of contact with the medium.

Many data storage devices, such as hard disk drives, are operated in a standard air (e.g., nitrogen, oxygen, and water vapor mixture) atmosphere. Spinning disks in hard disk drives at high revolutions per minute against the friction of an air atmosphere is largely inefficient and requires a certain amount of power. As an alternative, data storage devices, such as hard disk drives, can be filled with a lower-density gas, such as helium, and sealed to control and maintain the device's internal environment. Sealing mitigates or prevents leakage of internal gases from within the storage device. The use of helium, which has a density that is approximately one-seventh that of air, reduces friction and vibration in the device, thereby creating less drag and turbulence. Consequently, by running the hard disk drive in a less-dense atmosphere, such as an atmosphere of helium or a helium mixture, friction on the disk is reduced, thereby causing the disk to require less power in order to spin at a similar rate as the disks in drives that operate in standard air conditions. The use of helium also reduces the operating temperature of the drive, as well as noise generated by the drive.

The lower ambient pressure in sealed helium drives poses challenges to ABS designs, however. When operating in helium or a helium mixture, rather than air, a slider with a conventional ABS shape (i.e., designed to operate in a standard air atmosphere) can lose its pitching stability. Thus, there is an ongoing need for slider designs that improve the performance of magnetic storage systems in lower-pressure atmospheres.

SUMMARY

Disclosed herein are novel slider designs and data storage devices comprising sliders embodying the novel designs. Sliders incorporating the disclosures herein are particularly useful in low-ambient-pressure conditions, such as, for example, in sealed helium hard disk drives. The designs include at least one large front opening etched out of or created in the leading-edge surface of the slider (a feature referred to herein as a leading-edge pocket) to increase the amount of gas flowing into the leading-edge area of the ABS.

In some embodiments, a slider for a data storage device comprises a first side-edge surface, a second side-edge surface, a leading-edge surface extending between a front edge of the first side-edge surface and a front edge of the second side-edge surface, a back-edge surface, an air-bearing surface (ABS), and at least one leading-edge pocket in the leading-edge surface. The ABS has at least a first level, a second level, and a third level, wherein, in an orientation in which the ABS is oriented upward, the first level is above the second level, and the second level is above the third level, and the third level is above the back-edge surface. The at least one leading-edge pocket does not intersect either the first side-edge surface or the second side-edge surface. In an orientation in which the ABS is oriented upward, a depth of the at least one leading-edge pocket is at or below the third level. In some embodiments, a cross-section of the slider intersecting the at least one leading-edge pocket and taken between the first side-edge surface and the second side-edge surface and parallel to the leading-edge surface comprises an arc or a curve in a region of the cross-section intersecting the at least one leading-edge pocket.

In some embodiments, a shape of the at least one leading-edge pocket in the cross-section of the slider is substantially parabolic. In some embodiments, a shape of the at least one leading-edge pocket in the cross-section of the slider is symmetric about an axis extending from the maximum depth of the at least one leading-edge pocket to the second level, the axis being parallel to the leading-edge surface. In some embodiments, the cross-section of the slider further comprises a flat portion in a region of the cross-section intersecting the at least one leading-edge pocket.

In some embodiments, a distance between the first level and the third level is between approximately 0.35 μm and approximately 5.2 μm. In some embodiments, a distance between the first level and the third level is greater than about 2.5 μm.

In some embodiments, a maximum width of the at least one leading-edge pocket is between approximately 1 μm and approximately 300 μm.

In some embodiments, the at least one leading-edge pocket comprises a first leading-edge pocket and a second leading-edge pocket, and a midpoint of a width of the first leading-edge pocket at the second level is a first distance from the first side-edge surface, and a midpoint of a width of the second leading-edge pocket at the second level is a second distance from the second side-edge surface, the first distance being substantially equal to the second distance. In some such embodiments, the first and second leading-edge pockets are substantially identical.

In some embodiments, the at least one leading-edge pocket comprises a first leading-edge pocket and a second leading-edge pocket, and a maximum width of the first leading-edge pocket is substantially equal to a maximum width of the second leading-edge pocket.

In some embodiments, the at least one leading-edge pocket comprises a first leading-edge pocket and a second leading-edge pocket, wherein the first and second leading-edge pockets are substantially identical, and wherein a distance between the first level and the third level is greater than about 2.5 µm. In some such embodiments, a maximum width of each of the first and second leading-edge pockets is between approximately 100 µm and approximately 300 µm.

In some embodiments, a slider for a data storage device comprises an ABS, a leading-edge surface, and at least one leading-edge pocket in the leading-edge surface, wherein a cross-section of the slider taken parallel to the leading-edge surface and intersecting the at least one leading-edge pocket has at least one nonlinear side.

In some embodiments, the at least one nonlinear side is perpendicular to the leading-edge surface.

In some embodiments, the at least one leading-edge pocket comprises a first pocket and a second pocket, wherein the first and second pockets are substantially identical.

In some embodiments, in an orientation in which the ABS is oriented upward, a depth of the at least one leading-edge pocket relative to a highest level of the ABS is greater than about 2.5 µm.

In some embodiments, at least a portion of the cross-section of the slider taken parallel to the leading-edge surface and intersecting the at least one leading-edge pocket has a shape of at least a portion of a parabola.

In some embodiments, a maximum width of the at least one leading-edge pocket is between approximately 1 µm and approximately 300 µm.

Also disclosed are methods to fabricate sliders with at least one leading-edge pocket. A fabrication method may comprise, for example, ion milling to create the at least one leading-edge pocket.

BRIEF DESCRIPTION OF THE DRAWINGS

The disclosure herein is illustrated by way of example, and not by way of limitation, in the figures of the accompanying drawings, in which like reference numerals refer to similar elements and in which:

FIG. 3A illustrates the flow of air over the ABS of the prior-art slider of FIG. 2 when the slider operates in a standard-pressure environment.

FIG. 3B illustrates the flow of air over the ABS of the prior-art slider of FIG. 2 when the slider operates in a lower-pressure environment, such as in helium.

FIGS. 9A-9C illustrate portions of cross-sections of exemplary sliders that include at least one leading-edge pocket having various characteristics in accordance with some embodiments.

DETAILED DESCRIPTION

The following description is made for the purpose of illustrating the general principles of the present disclosure and is not meant to limit the inventive concepts claimed herein. Furthermore, particular embodiments and/or features described herein may be used in combination with other described embodiments and/or features in various possible combinations and permutations.

Figure 1:
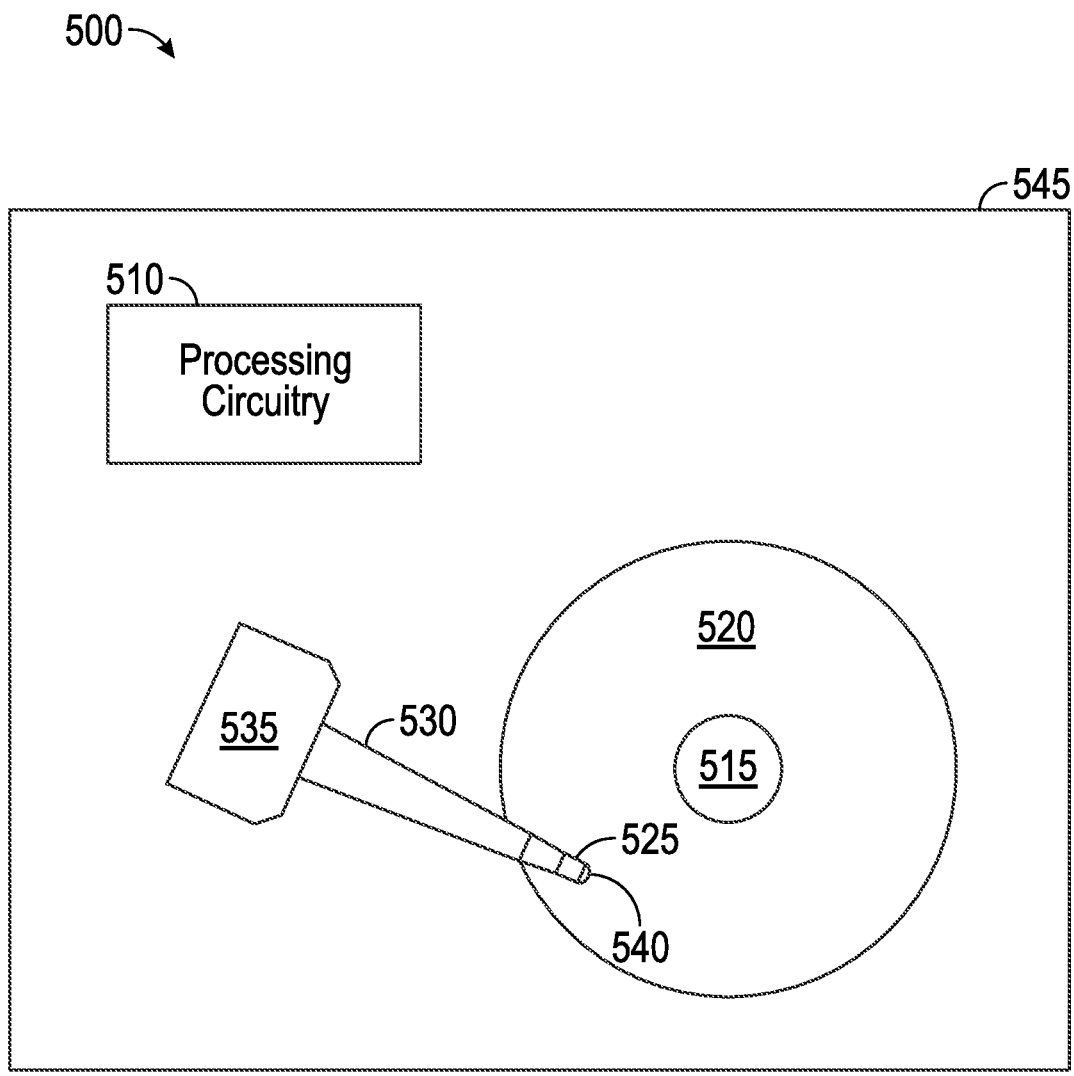
FIG. 1 illustrates several components of an exemplary hard disk drive that may incorporate various of the disclosed embodiments.

FIG. 1 illustrates several components of an exemplary magnetic hard disk drive 500 in accordance with some embodiments. The hard disk drive 500 includes a spindle 515 that supports and rotates a magnetic disk 520. The spindle 515 is rotated by a spindle motor (not shown) that is controlled by a motor controller (not shown) that may be implemented in electronics of the hard disk drive 500. A slider 525, which is supported by a suspension and actuator arm 530, has a combined read and write magnetic head 540. The head 540 may include only one read sensor, or it may include multiple read sensors. The read sensors in the head 540 may include, for example, one or more giant magnetoresistance (GMR) sensors, tunneling magnetoresistance (TMR) sensors, or another type of magnetoresistive sensor. An actuator 535 rotatably positions the suspension and actuator arm 530 over the magnetic disk 520. The components of the hard disk drive 500 may be mounted on a housing 545. It is to be understood that although FIG. 1 illustrates a single disk 520, a single slider 525, a single head 540, and a single suspension and actuator arm 530, hard disk drive 500 may include a plurality (i.e., more than one) of disks 520, sliders 525, heads 540, and suspension and actuator arms 530.

In operation, the actuator 535 moves the suspension and actuator arm 530 to position the slider 525 so that the magnetic head 540 is in a transducing relationship with the surface of the magnetic disk 520. When the spindle motor rotates the disk 520, the slider 525 is supported on a thin cushion of air known as the air bearing that exists between the surface of the disk 520 and an air-bearing surface of the slider 525. The head 540 may be used to write information to multiple tracks on the surface of the disk 520 and to read previously-recorded information from the tracks on the surface of the disk 520. Processing circuitry 510 provides to the head 540 signals representing information to be written to the disk 520 and receives from the head 540 signals representing information read from the disk 520. The processing circuitry 510 also provides signals to the spindle motor to rotate the magnetic disk 520, and to the actuator 535 to move the slider 525 to various tracks.

To read information from the magnetic disk 520, the slider 525 passes over a region of the disk 520, and the head 540 detects changes in resistance due to magnetic field variations recorded on the disk 520, which represent the recorded bits.

The slider 525 has a gas-bearing surface that faces the surface of the disk 520 and counteracts a preload bias that pushes the slider toward the disk 520. For convenience, in this document the gas-bearing surface is referred to as the air-bearing surface (ABS) and the gas is generally referred to as "air," although it is to be understood that the gas used in a hard disk drive 500 may be a gas other than air (e.g., the gas may be helium). For simplicity, throughout this disclosure, the surface of the slider 525 that faces or that will eventually face the disk 520 is referred to as the ABS.

As the disk 520 rotates, the disk 520 drags air under the slider 525 and along the ABS in a direction approximately parallel to the tangential velocity of the disk 520. As the air passes under the ABS, air compression along the air flow path causes the air pressure between the disk 520 and the ABS to increase, which creates a hydrodynamic lifting force that counteracts the tendency of the suspension and actuator arm 530 to push the slider 525 toward the disk 520. The slider 525 thus flies above the disk 520 but in close proximity to the surface of the disk 520. To obtain good performance, it is desirable for the slider 525 to maintain a substantially constant flying height above the surface of the disk 520. The degree of stability of the fly-height of the slider influences the performance of the magnetic head 540. The design of the slider 525 ABS has an impact on the flying characteristics of the slider 525 and therefore the performance of the magnetic head 540.

Figure 2:
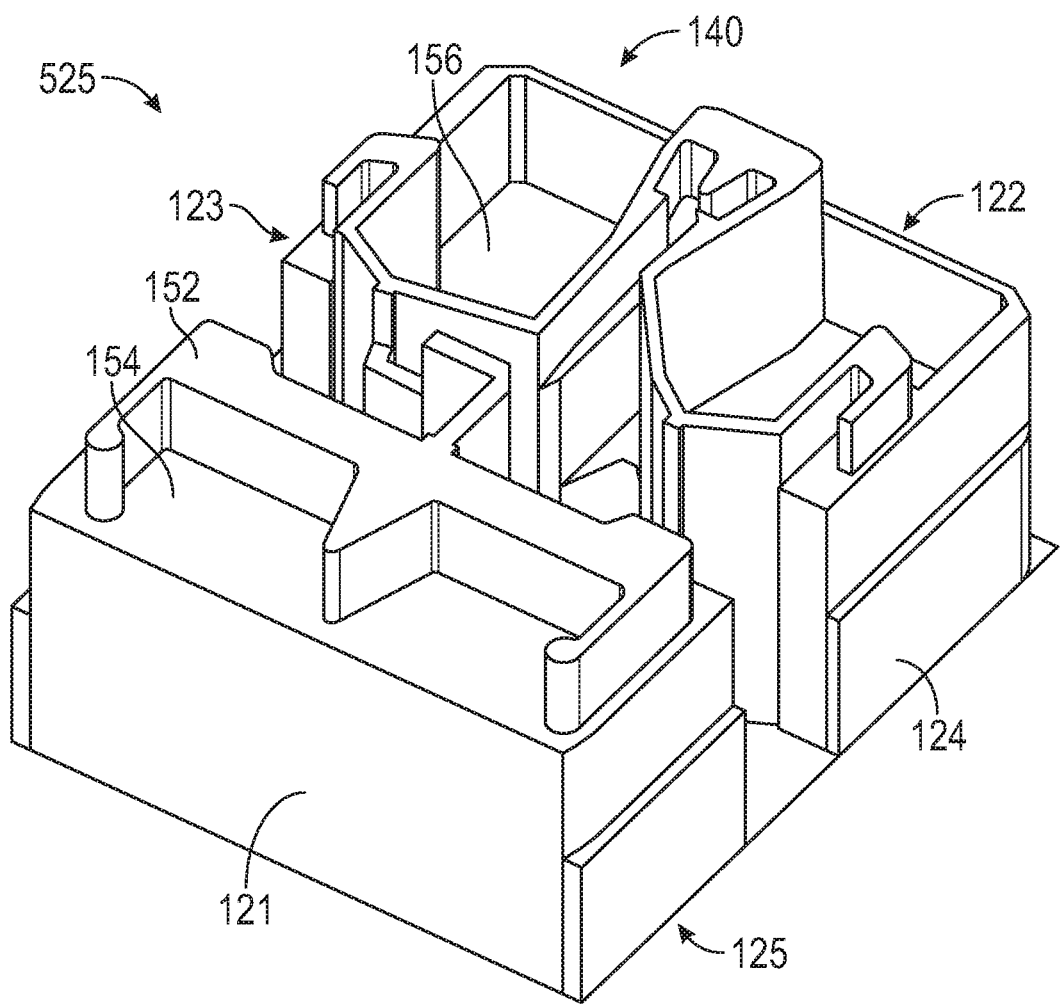
FIG. 2 illustrates a prior-art slider.

FIG. 2 illustrates a prior-art slider 525. The slider 525 has a leading-edge surface 121, a trailing-edge surface 122, side-edge surfaces 123, 124, a back-edge surface 125, and an ABS 140. The side-edge surfaces 123, 124 extend between the leading-edge surface 121 and the trailing-edge surface 122. It is to be understood that the side-edge surfaces 123, 124 are not necessarily contiguous between the leading-edge surface 121 and the trailing-edge surface 122. For example, in FIG. 2, the side-edge surface 124 has a gap near the middle of the slider 525, and the side-edge surface 123 has a similar gap. It is also to be understood that the side-edge surfaces 123, 124 need not be flat. For example, in FIG. 2, the side-edge surface 124 includes a step approximately mid-way between where it intersects the back-edge surface 125 and the ABS 140. The leading-edge surface 121 extends between the front edge of the side-edge surface 123 and the front edge of the side-edge surface 124. The back-edge surface 125 extends between the back edge of the side-edge surface 123 and the back edge of the side-edge surface 124.

The ABS 140 has several levels, including a first level 152, a second level 154, and a third level 156. When the slider 525 is facing upward as illustrated in FIG. 2, the first level 152 is above the second level 154, the second level 154 is above the third level 156, and the third level 156 is above the back-edge surface 125. As shown in FIG. 2, the ABS 140 may include various features at the first level 152. These features may include a read/write transducer near the trailing-edge surface 122 and/or a pair of raised side rails. When the slider 525 is in use, these features face the disk 520 surface.

FIG. 3A illustrates the flow of air over the ABS 140 when the slider 525 operates in a standard pressure environment. The arrows shown in FIG. 3A represent the flow of air over the ABS 140 at and near the leading-edge surface 121. FIG. 3B illustrates the effect of using the slider 525 with in lower-density gas atmosphere, such as in a sealed helium device. As shown by the arrows in FIG. 3B, less gas flows past the leading-edge surface 121 and over the ABS 140, which reduces the pressure created by the slider features (e.g., the features of the ABS 140) and thereby adversely affects the flight characteristics of the slider 525. For example, the flow of gas may not create sufficient pressure to counteract the tendency of the suspension and actuator arm 530 to push the slider 525 toward the disk 520. As a result, when in lower-ambient-pressure conditions, the slider 525 may not fly at the desired height and/or pitch, or it might be less stable than desired, which can adversely affect the performance and/or lifespan of the data storage device.

Disclosed herein are slider embodiments with at least one leading-edge pocket (or opening) in the leading-edge surface to improve slider flight characteristics in lower-ambient-pressure environments (e.g., in sealed helium hard drives). As the slider flies over the disk, the at least one large leading-edge pocket collects significantly more gas and re-directs it over the ABS 140 to increase the flow of gas in the leading-edge area. The at least one leading-edge pocket thus provides a relatively large effective pressurization area and lift force.

Figure 4A:
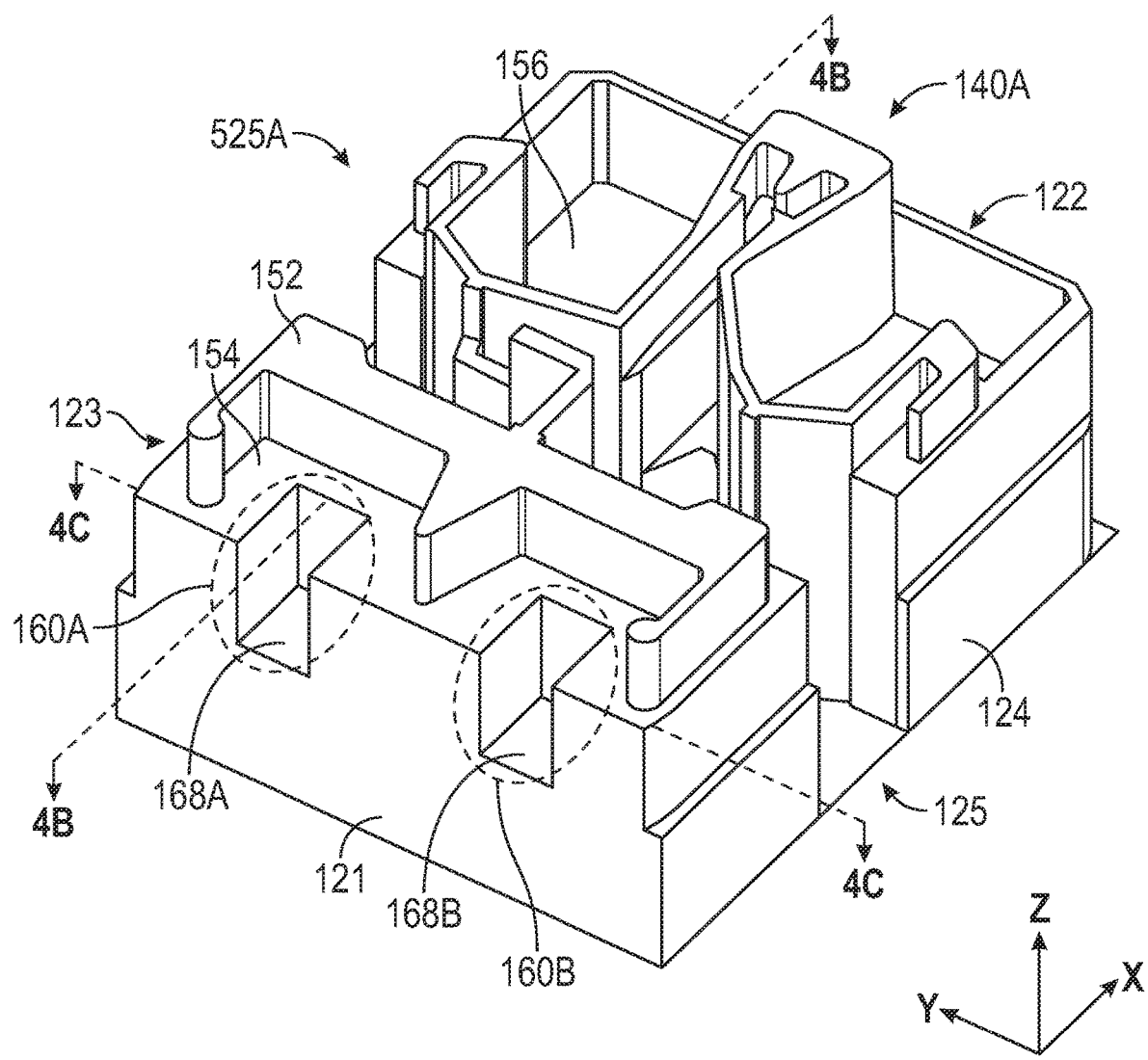
FIG. 4A is a perspective view of a slider with at least one leading-edge pocket in the leading-edge surface in accordance with some embodiments.

FIG. 4A is a perspective view of a slider 525A with at least one leading-edge pocket 160 in the leading-edge surface 121 in accordance with some embodiments. A set of x-, y-, and z-axes is also shown for convenience. The slider 525A has a leading-edge surface 121, a trailing-edge surface 122, two side-edge surfaces 123, 124, a back-edge surface 125, and an ABS 140A. The side-edge surfaces 123, 124 extend between the leading-edge surface 121 and the trailing-edge surface 122. It is to be understood that the side-edge surfaces 123, 124 need not be contiguous between the leading-edge surface 121 and the trailing-edge surface 122. For example, in FIG. 4A, the side-edge surface 124 has a gap near the middle of the slider 525, and the side-edge surface 123 has a similar gap. It is also to be understood that the side-edge surfaces 123, 124 need not be flat. For example, in FIG. 4A, the side-edge surface 124 includes a step approximately mid-way between where it intersects the back-edge surface 125 and the ABS 140A. The leading-edge surface 121 extends between the front edge of the side-edge surface 123 and the front edge of the side-edge surface 124. The back-edge surface 125 extends between the back edge of the side-edge surface 123 and the back edge of the side-edge surface 124.

The ABS 140A has several levels, including a first level 152, a second level 154, and a third level 156. When the slider 525A is facing upward as illustrated in FIG. 4A, the first level 152 is above the second level 154, and the second level 154 is above the third level 156, and the third level 156 is above the back-edge surface 125. In some embodiments, the second level 154 is between approximately 50 nm and 200 nm below the first level 152, and the third level 156 is between approximately 300 nm and 5000 nm below the second level 154. For example, the second level 154 may be approximately 120 nm below the first level 152, and the third level 156 may be approximately 700-1000 nm below the second level 154. In some embodiments, the distance between the first level 152 and the third level 156 is between approximately 0.35 µm (i.e., microns) and 5.2 µm.

The slider 525A also includes at least one leading-edge pocket 160. In the exemplary embodiment of FIG. 4A, the slider 525A includes two leading-edge pockets 160, namely a first leading-edge pocket 160A and a second leading edge-pocket 160B. It is to be understood that a slider may include fewer or more than two leading-edge pockets 160. In the exemplary embodiment of FIG. 4A, each of the leading-edge pockets 160A, 160B has a cuboid shape. The leading-edge pocket 160A extends to a level 168A, and the leading-edge pocket 160B extends to a level 168B. The levels 168A, 168B are at or below the third level 156 when the ABS 140 faces up (as shown in FIG. 4A).

Figure 4B:
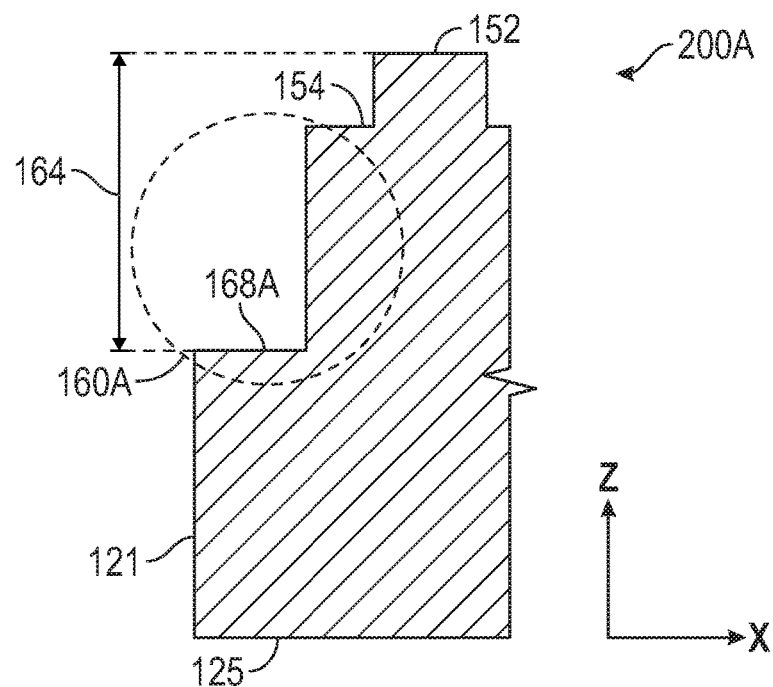
FIG. 4B shows a portion of a cross-section of the slider of FIG. 4A.

FIG. 4B shows a portion of a cross-section 200A of the slider 525A along the dashed line labeled 4B-4B in FIG. 4A (i.e., taken between the leading-edge surface 121 and the trailing edge surface 122 and parallel to the first and second side-edge surfaces 123, 124 (i.e., perpendicular to the back-edge surface 125) through the leading-edge pocket 160A). The cross-section 200A lies in an x-z plane. As shown, the portion of the cross-section 200A that intersects and corresponds to the leading-edge pocket 160A includes a right angle. The base of the right angle is at the level 168A, which is at or below the third level 156. The level 168A is a distance 164 below the first level 152. The distance 164 may be, for example, between approximately 0.35 µm (i.e., microns) and 5.2 µm.

Figure 4C:
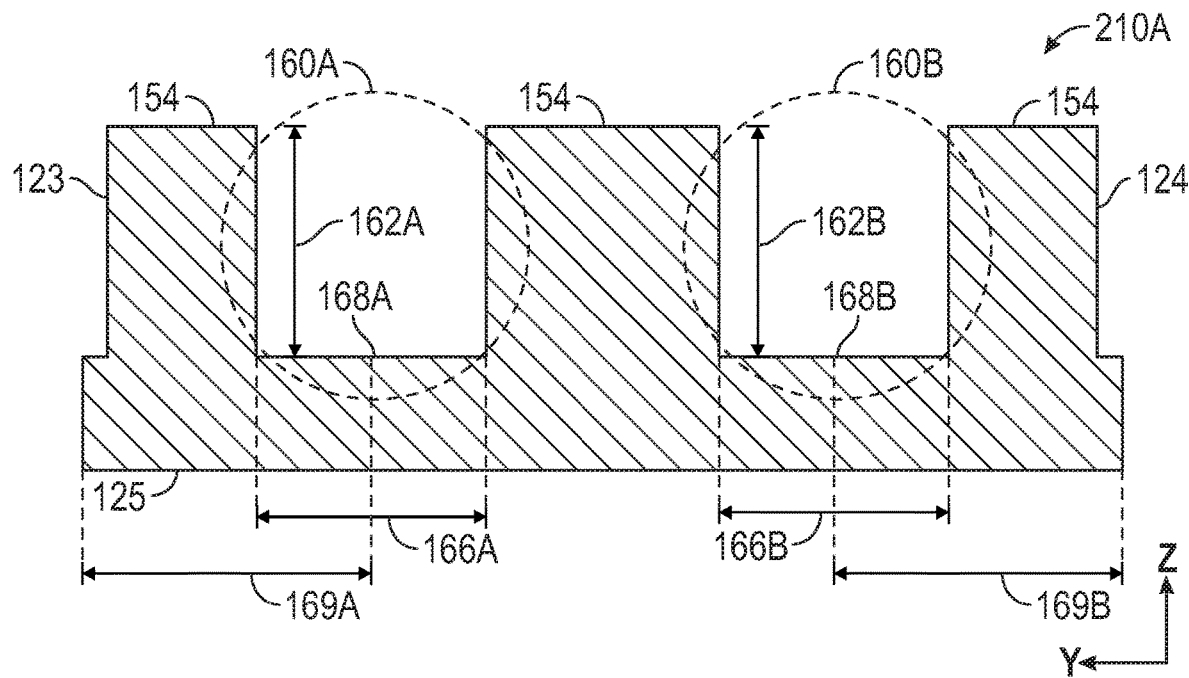
FIG. 4C shows another cross-section of the slider of FIG. 4A.

FIG. 4C shows a cross-section 210A of the slider 525A along the dashed line labeled 4C-4C in FIG. 4A (i.e., taken near the front edges of the first and second side-edge surfaces 123, 124, between the first and second side-edge surfaces 123, 124 and parallel to the leading-edge surface 121 and the trailing-edge surface 122 (i.e., perpendicular to the back-edge surface 125) through the leading-edge pockets 160A, 160B). The cross-section 210A lies in a y-z plane. As shown, the portions of the cross-section 210A that intersect and correspond to the leading-edge pockets 160A, 160B are rectangular in shape (i.e., each includes three of the four sides of a rectangle) and include right angles.

The depths of the leading-edge pockets 160A, 160B are at the levels 168A, 168B, respectively. The levels 168A, 168B (and therefore the depths of the leading-edge pockets 160A, 160B) are at or below the third level 156. For the leading-edge pocket 160A, the level 168A is a distance 162A below the second level 154. For the leading-edge pocket 160B, the level 168B is a distance 162B below the second level 154. In the embodiment illustrated in FIGS. 4A and 4C, the distances 162A and 162B are substantially equal, but in general they may differ. Likewise, although the levels 168A, 168B of the leading-edge pockets 160A, 160B are shown as being at substantially the same level, they may differ.

The leading-edge pocket 160A has a width 166A, and the leading-edge pocket 160B has a width 166B. Because the leading-edge pockets 160A and 160B are substantially cuboid in shape, the widths 166A and 166B are substantially uniform in the z-direction (i.e., the widths of the leading-edge pockets 160A and 160B do not vary based on depth from the second level 154). The widths 166A, 166B may be, for example, between approximately 1 µm and 300 µm. As illustrated in FIG. 4C, the widths 166A, 166B are substantially the same. In other embodiments, the widths 166A, 166B may differ.

In the cross-section 210A, the midpoint of the leading-edge pocket 160A is a distance 169A from the side-edge surface 123, and the midpoint of the leading-edge pocket 160B is a distance 169B from the side-edge surface 124. In the exemplary embodiment shown in FIG. 4C, the distances 169A and 169B are substantially equal, but in general, they may differ. Furthermore, multiple (i.e., two or more) leading-edge pockets 160 may be positioned along the leading-edge surface 121 to provide the desired flight characteristics for the slider 525. In embodiments with multiple leading-edge pockets 160, the leading-edge pockets 160 may be distributed uniformly or non-uniformly along the leading-edge surface 121.

Figure 5:
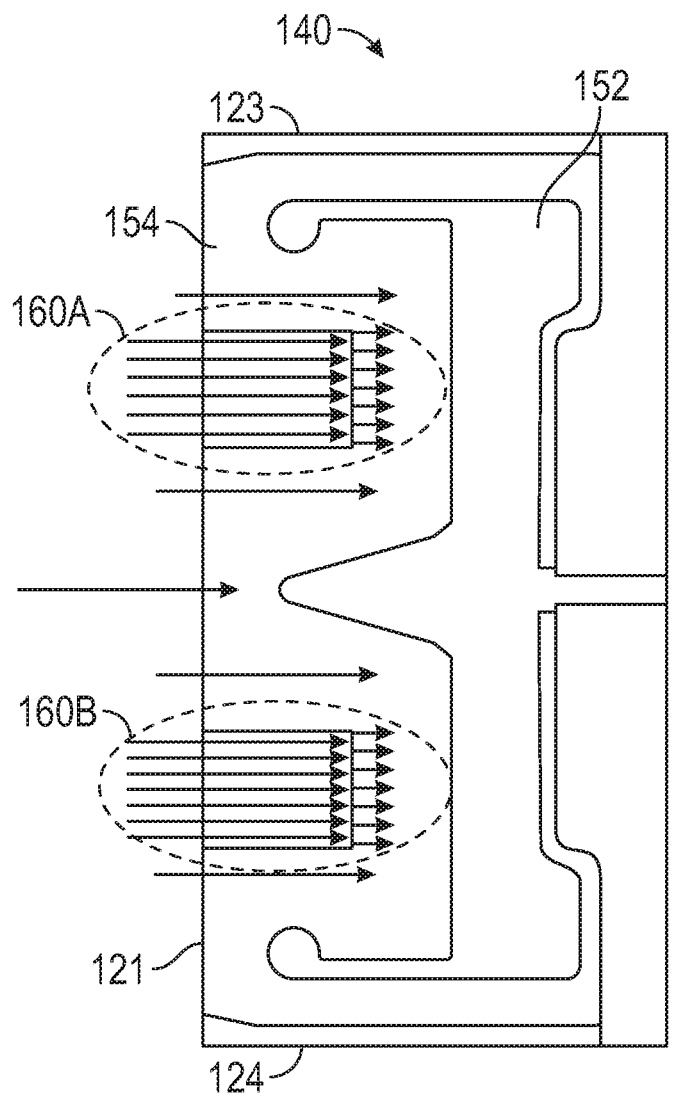
FIG. 5 illustrates the effect of the at least one leading-edge pocket on the flow of gas over a portion of the ABS of the exemplary slider of FIGS. 4A through 4C.

FIG. 5 illustrates the effect of the at least one leading-edge pocket 160 on the flow of gas over the ABS 140 near the leading-edge surface 121. As shown, the leading-edge pockets 160A and 160B collect gas that impinges on the leading-edge surface 121 and redirect it over the ABS 140, thereby creating a relatively large effective pressurization area and lift force. The comparatively large volume of gas collected in the leading-edge pockets 160A, 160B flows into the shallow leading step of the ABS 140 (shown as being at the second level 154) and generates gas compression that may be comparable to that generated by conventional sliders 525 operating in ambient-air pressure conditions.

Figure 6A:
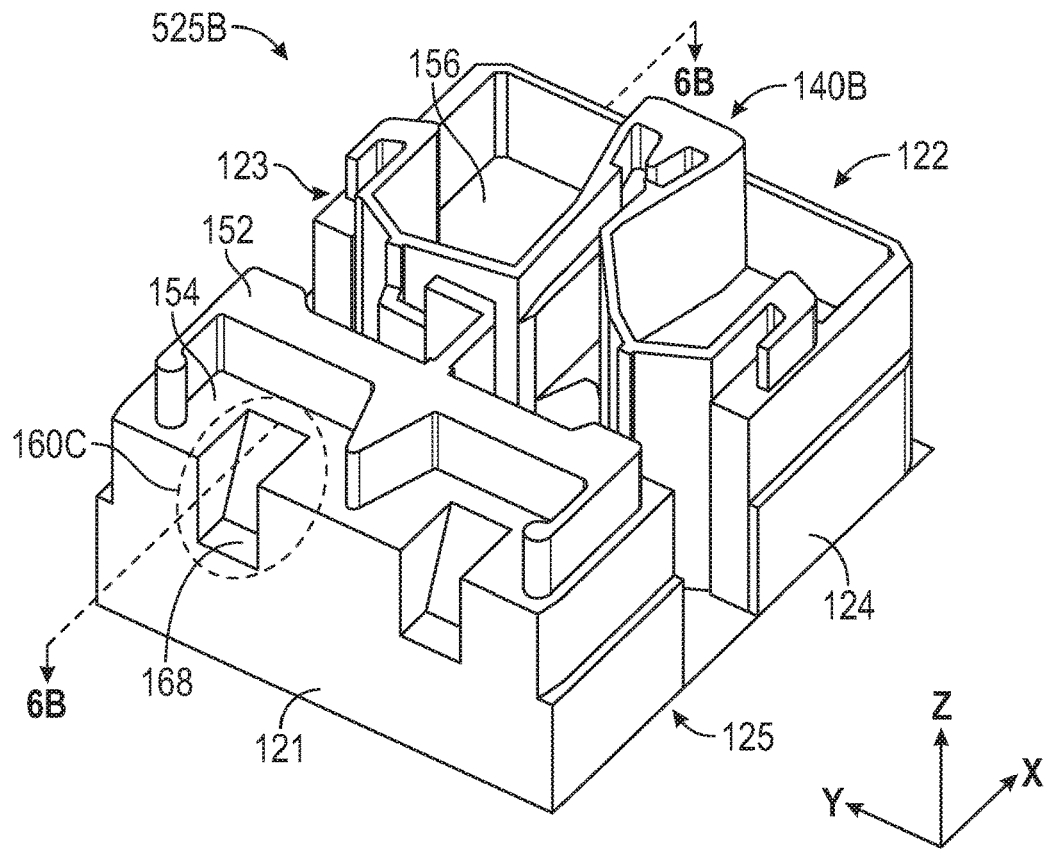
FIG. 6A illustrates a slider that includes at least one leading-edge pocket 160C with a slope angled away from the leading-edge surface in accordance with some embodiments.

FIGS. 4A-5 illustrate the effect of including at least one leading-edge pocket 160 that has a rectangular (cuboid) shape. The at least one leading-edge pocket 160 may have any other suitable shape that provides desired flight characteristics in lower-ambient-pressure conditions. As one example, FIG. 6A illustrates a slider 525B that includes at least one leading-edge pocket 160C with a slope angled away from the leading-edge surface 121. Other features shown in FIG. 6A (e.g., features of the ABS 140B) were discussed above in the context of FIG. 4A; that discussion is not repeated here.

Figure 6B:
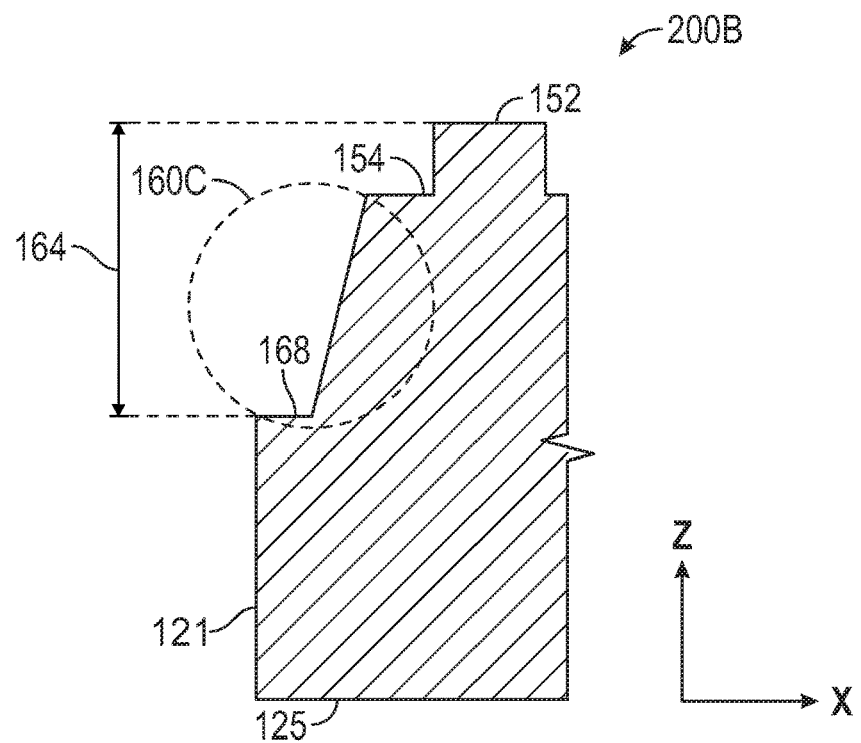
FIG. 6B shows a portion of a cross-section of the slider of FIG. 6A.

FIG. 6B shows a portion of a cross-section 200B of the slider 525B along the dashed line labeled 6B-6B in FIG. 6A (i.e., taken between the leading-edge surface 121 and the trailing edge surface 122 and parallel to the first and second side-edge surfaces 123, 124 (i.e., perpendicular to the back-edge surface 125) through the leading-edge pocket 160C). The cross-section 200B lies in an x-z plane. As shown, the portion of the cross-section 200B that intersects and corresponds to the leading-edge pocket 160C includes an oblique angle (i.e., an angle that is not 90 degrees). In the embodiment illustrated in FIG. 6B, the oblique angle is an obtuse angle (i.e., an angle greater than 90 degrees but less than 180 degrees). The base of the obtuse angle is the level 168, which is at or below the third level 156. The level 168 is a distance 164 below the first level 152. The distance 164 may be, for example, between approximately 0.35 µm (i.e., microns) and 5.2 µm.

Figures 7A, 7B:
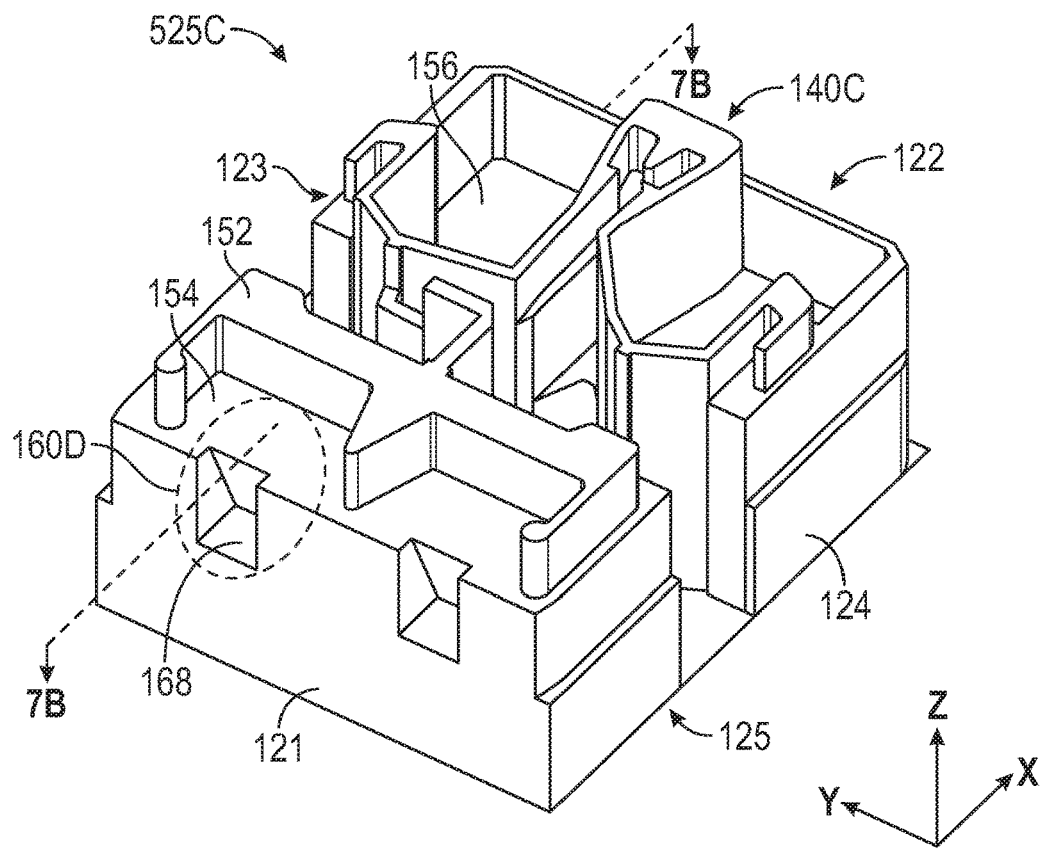
FIG. 7A illustrates a slider that includes at least one leading-edge pocket with a slope angled toward the leading-edge surface in accordance with some embodiments.
FIG. 7B shows a portion of a cross-section of the slider of FIG. 7A.

FIG. 7A illustrates a slider 525C that includes at least one leading-edge pocket 160D that includes a slope angled toward the leading-edge surface 121. Other features shown in FIG. 7A (e.g., features of the ABS 140C) were discussed above in the context of FIG. 4A; that discussion is not repeated here.

FIG. 7B shows a portion of a cross-section 200C of the slider 525C along the dashed line labeled 7B-7B in FIG. 7A (i.e., taken between the leading-edge surface 121 and the trailing edge surface 122 and parallel to the first and second side-edge surfaces 123, 124 (i.e., perpendicular to the back-edge surface 125) through the leading-edge pocket 160D). The cross-section 200C lies in an x-z plane. As shown, the portion of the cross-section 200C that intersects and corresponds to the leading-edge pocket 160D includes an oblique angle (i.e., an angle that is not 90 degrees). In the embodiment illustrated in FIG. 7B, the oblique angle is an acute angle (i.e., an angle less than 90 degrees). The base of the oblique angle is the level 168, which is at or below the third level 156. The level 168 is a distance 164 below the first level 152. The distance 164 may be, for example, between approximately 0.35 μm (i.e., microns) and 5.2 μm below the first level.

Figure 8A:
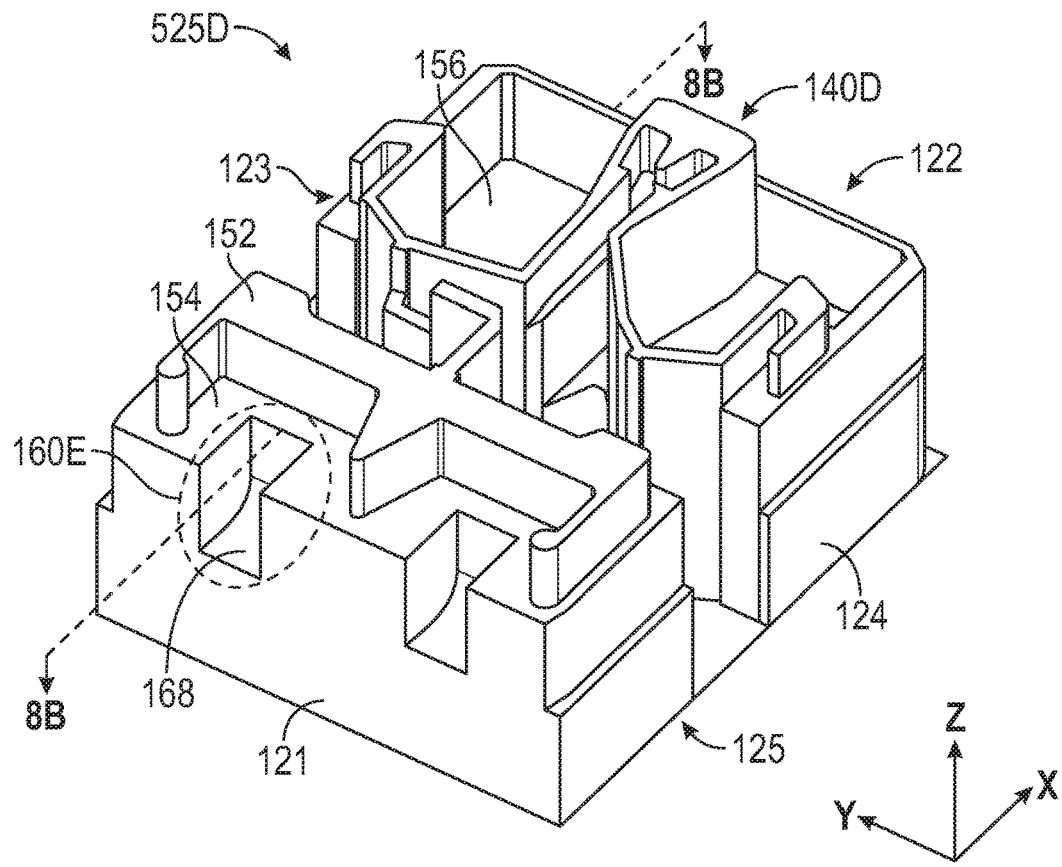
FIG. 8A illustrates a slider that includes at least one leading-edge pocket with a curved slope in accordance with some embodiments.

FIG. 8A illustrates a slider 525D that includes at least one leading-edge pocket 160E that includes a slope. Other features shown in FIG. 8A (e.g., features of the ABS 140D) were discussed above in the context of FIG. 4A; that discussion is not repeated here.

Figure 8B:
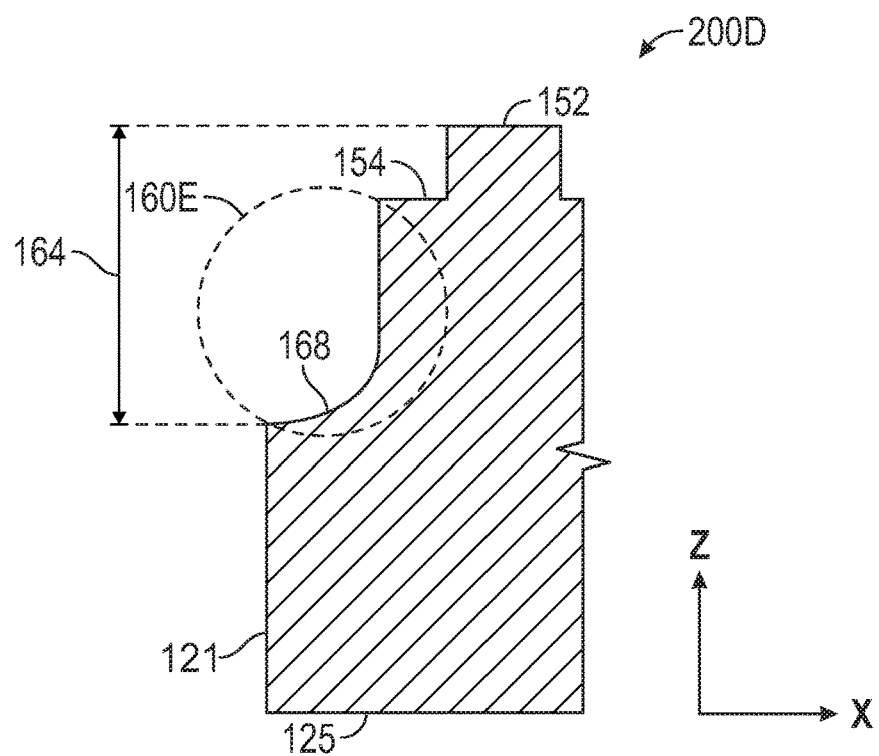
FIG. 8B shows a portion of a cross-section of the slider of FIG. 8A.

FIG. 8B shows a portion of a cross-section 200D of the slider 525D along the dashed line labeled 8B-8B in FIG. 8A (i.e., taken between the leading-edge surface 121 and the trailing edge surface 122 and parallel to the first and second side-edge surfaces 123, 124 (i.e., perpendicular to the back-edge surface 125) through the leading-edge pocket 160E). The cross-section 200D lies in an x-z plane. As shown, the portion of the cross-section 200D that intersects and corresponds to the leading-edge pocket 160E includes an arc or curve. In the embodiment illustrated in FIG. 8B, the arc extends only part way between the leading-edge surface 121 and the second level 154. In some embodiments, the arc extends from the leading-edge surface 121 and the second level 154. The surface level 168 of the slope varies along the x-axis. At its lowest point, the level 168 is at or below the third level 156. At its lowest point, the level 168 is a distance 164 below the first level 152. The distance 164 may be, for example, between approximately 0.35 μm (i.e., microns) and 5.2 μm.

It is to be understood that cross-sections 210 (i.e., taken near the front edges of the first and second side-edge surfaces 123, 124, between the first and second side-edge surfaces 123, 124 and parallel to the leading-edge surface 121 and the trailing-edge surface 122 (i.e., perpendicular to the back-edge surface 125) through the leading-edge pockets 160A, 160B) of any of the sliders 525B, 525C, or 525D would have characteristics similar to those shown in FIG. 4C. Specifically, the portions of the cross-sections 210 intersecting and corresponding to the leading-edge pockets 160C, 160D, and 160E would be rectangular in shape (i.e., each would include three of the four sides of a rectangle) and would include right angles.

FIGS. 9A-9C illustrate portions of cross-sections 200E, 200F, and 200G of exemplary sliders 525 that include at least one leading-edge pocket 160 having various characteristics. The cross-sections 200E, 200F, and 200G are taken along a dashed line akin to those labeled 4B-4B, 6B-6B, 7B-7B, and 8B-8B, respectively, in FIGS. 4, 6, 7, and 8 (i.e., taken between the leading-edge surface 121 and the trailing edge surface 122 and parallel to the first and second side-edge surfaces 123, 124 (i.e., perpendicular to the back-edge surface 125) through the leading-edge pocket 160). The cross-sections 200E, 200F, and 200G lie in x-z planes.

In FIG. 9A, the at least one leading-edge pocket 160F has an irregular shape. The surface of the at least one leading-edge pocket 160F is at a level 168, which varies along the x-axis and is not necessarily monotonic in the +x or −x direction. Because the at least one leading-edge pocket 160F has an irregular shape, the distance 164 between the first level 152 and the level 168 of the at least one leading-edge pocket 160F depends on where along the cross-section 200E the distance is measured. At its lowest point, the level 168 is at or below the third level 156. At its lowest point, the level 168 is a distance 164 below the first level 152. The distance 164 may be, for example, between approximately 0.35 μm (i.e., microns) and 5.2 μm.

In FIG. 9B, the at least one leading-edge pocket 160G includes a cavity that extends away from the leading-edge surface 121. It is to be understood that the cavity may additionally or alternatively extend toward one or both of the side-edge surfaces 122, 123. The slider 525 may also include more than one cavity. Because the cavity of the at least one leading-edge pocket 160G may extend downward, the distance 164 between the first level 152 and the level 168 of the at least one leading-edge pocket 160G depends on where along the cross-section 200F the distance is measured. The distance 164 may be, for example, between approximately 0.35 μm (i.e., microns) and 5.2 μm. At its lowest point, the level 168 is at or below the third level 156.

In FIG. 9C, the at least one leading-edge pocket 160H includes a protrusion that extends toward the leading-edge surface 121. It is to be understood that the protrusion may additionally or alternatively extend toward one or both of the side-edge surfaces 122, 123. Moreover, the slider 525 may include more than one protrusion. The base of the at least one leading-edge pocket 160H is at the level 168, which is at or below the third level 156. The level 168 is a distance 164 below the first level 152. The distance 164 may be, for example, between approximately 0.35 μm (i.e., microns) and 5.2 μm below the first level.

It is to be understood that a slider 525 may include combinations of the features disclosed herein. As just one example, a particular slider 525 may include both a cavity (FIG. 9B) and a protrusion (FIG. 9C).

Figure 10A:
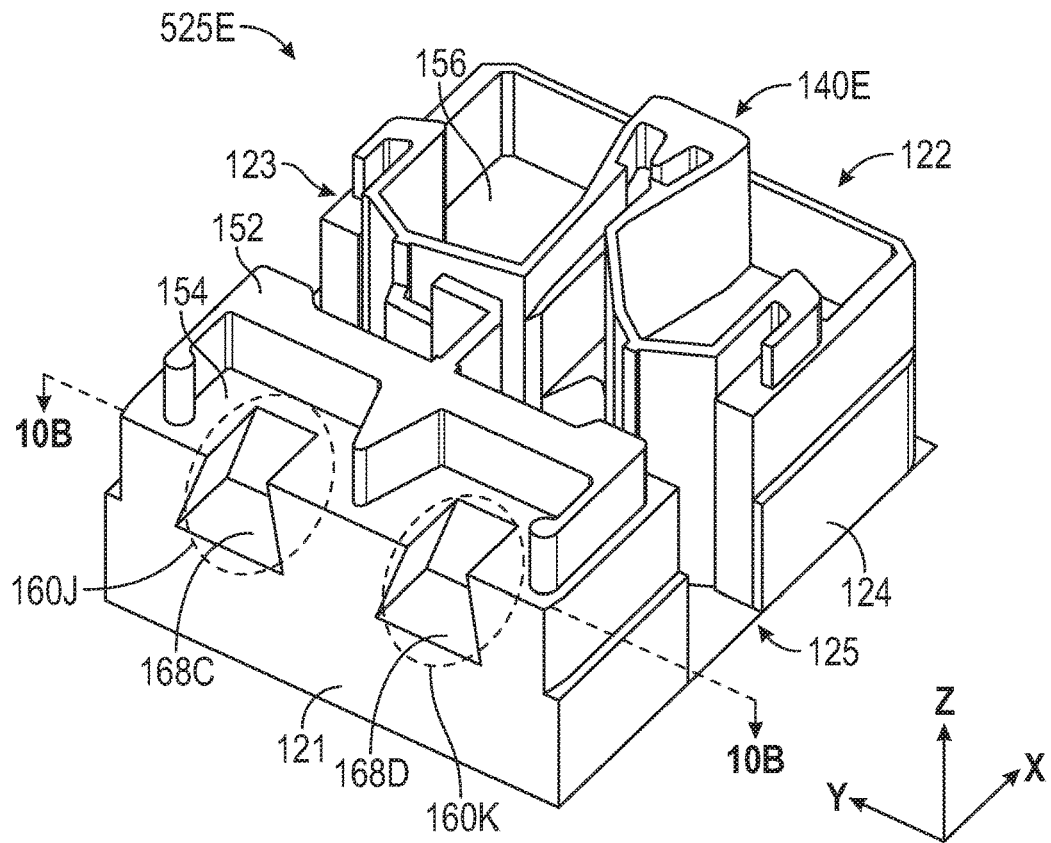
FIG. 10A illustrates an exemplary slider that includes leading-edge pockets with sides angling inward, away from the side-edge surfaces in accordance with some embodiments.

FIGS. 4A, 6A, 7A, and 8A all illustrate exemplary sliders 525 having at least one leading-edge pocket 160 with substantially vertical side edges. All of these illustrated exemplary sliders 525 have cross-sections 210 in a y-z plane that are similar or identical to the cross-section 210A shown in FIG. 4C. In other embodiments, the at least one leading-edge pocket 160 does not have substantially vertical side edges. For example, FIG. 10A illustrates an exemplary slider 525E that includes leading-edge pockets 160J, 160K, each of which has angled sides. Other features shown in FIG. 10A (e.g., features of the ABS 140E) were discussed above in the context of FIG. 4A; that discussion is not repeated here. As shown in FIG. 10A, the sides of the leading-edge pockets 160J, 160K are angled inward, away from the side-edge surfaces 123, 124.

Figure 10B:
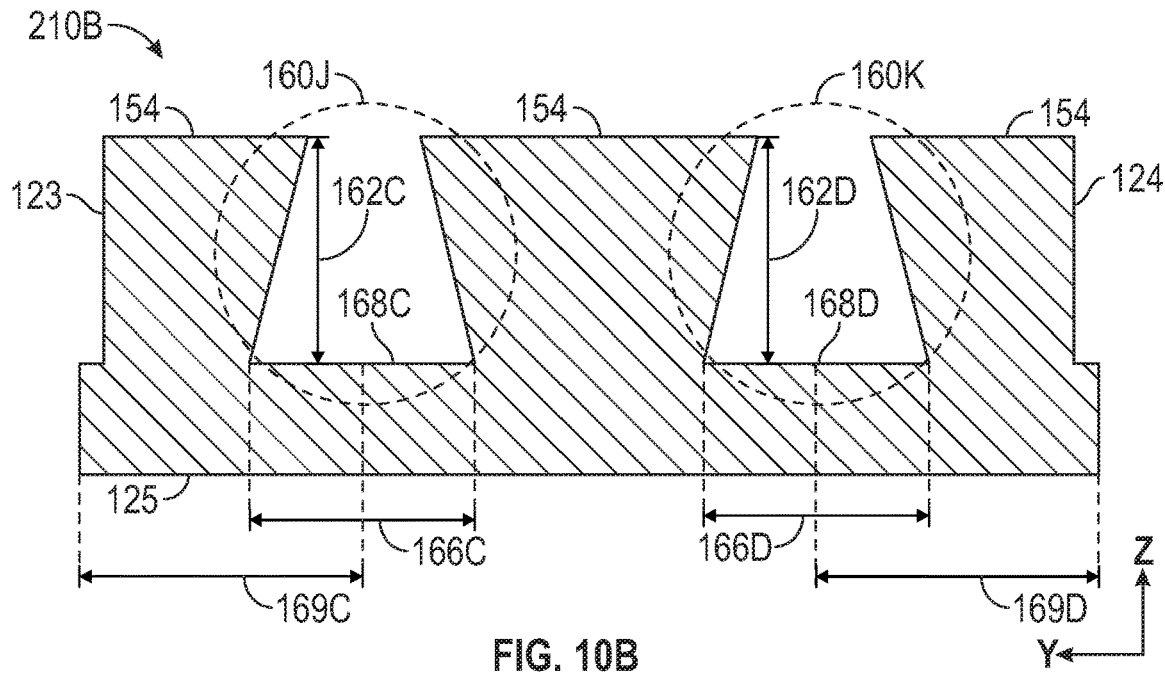
FIG. 10B shows a cross-section of the slider of FIG. 10A.

FIG. 10B shows a cross-section 210B of the slider 525E along the dashed line labeled 10B-10B in FIG. 10A (i.e., taken near the front edges of the first and second side-edge surfaces 123, 124, between the first and second side-edge surfaces 123, 124 and parallel to the leading-edge surface 121 and the trailing-edge surface 122 (i.e., perpendicular to the back-edge surface 125) through the leading-edge pockets 160J, 160K). The cross-section 210B lies in a y-z plane and includes at least one oblique angle, which happens to be an acute angle in FIG. 10B. As shown, the portion of the cross-section 210B that intersects and corresponds to the leading-edge pockets 160J, 160K includes trapezoidal shapes (i.e., three of the four sides of a trapezoid, where a trapezoid is as a quadrilateral with at least one pair of parallel sides). FIG. 10B illustrates isosceles trapezoids, but it is to be understood that the shape need not be isosceles (i.e., the lengths of the sides and/or the oblique angles may differ). Moreover, although FIG. 10B illustrates that the trapezoids corresponding to the leading-edge pockets 160J, 160K are similar or identical, they need not be. In general (i.e., not just in the context of FIGS. 10A and 10B), each leading-edge pocket 160 of a slider 525 may have a unique size, shape, and features.

The depth of the leading-edge pocket 160J is at the level 168C, and the depth of the leading-edge pocket 160K is at the level 168D. The depths of the leading-edge pockets 160J, 160k are at or below the third level 156. For the leading-edge pocket 160J, the level 168C is a distance 162C below the second level 154. For the leading-edge pocket 160K, the level 168D is a distance 162D below the second level 154. In the embodiment illustrated in FIGS. 10A and 10B, the distances 162C and 162D are substantially equal, but in general they may differ. Likewise, although the levels 168C, 168D of the leading-edge pockets 160J, 160K are shown at the same height, in general they may differ.

The leading-edge pocket 160J has a width 166C at its widest point (i.e., at the base of the trapezoidal portion of the cross-section 210B corresponding to the leading-edge pocket 160J), and the leading-edge pocket 160K has a width 166D at its widest point (i.e., at the base of the trapezoidal portion of the cross-section 210B corresponding to the leading-edge pocket 160K). The widths 166C, 166D may be, for example, between approximately 1 µm and 300 µm. As illustrated in FIG. 10B, the widths 166C, 166D are substantially the same, but, in general, the widths 166C, 166D may differ.

In the cross-section 210B, the midpoint of the leading-edge pocket 160J is a distance 169C from the side-edge surface 123, and the midpoint of the leading-edge pocket 160K is a distance 169D from the side-edge surface 124. It is to be understood, not only in the context of FIG. 10B but also for similar figures discussed below, that the distances 169C, 169D may be referenced to any convenient positions on the side-edge surfaces 123, 124. For example, as shown in FIG. 10B, in the exemplary embodiment illustrated, the side-edge surfaces 123, 124 include steps. The distances 169C, 169D are referenced to the portions of the side-edge surfaces 123, 124 corresponding to the widest portions of the slider 525E, but they could alternatively be referenced to the narrower closer surfaces of the side-edge surfaces 123, 124. In the exemplary embodiment shown in FIG. 10B, the distances 169C and 169D are substantially equal, but, in general, they may differ. Furthermore, multiple (i.e., two or more) leading-edge pockets 160, each potentially having a different size, shape, and features, may be positioned along the leading-edge surface 121, uniformly or non-uniformly, to provide the desired flight characteristics for the slider 525E. It will be appreciated that, in such cases, the distances 169 may vary substantially among leading-edge pockets 160.

Figure 11A:
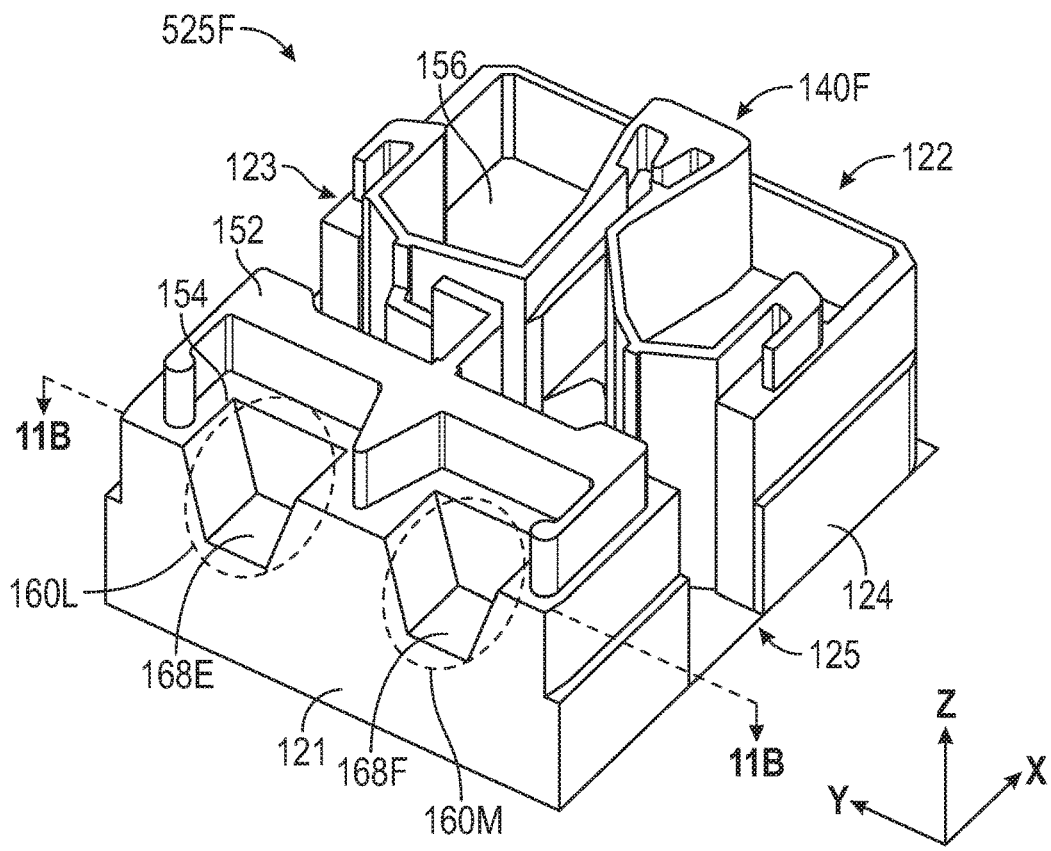
FIG. 11A illustrates another exemplary slider that includes leading-edge pockets with sides angling outward, toward the side-edge surfaces in accordance with some embodiments.

FIG. 11A illustrates an exemplary slider 525F that includes leading-edge pockets 160L, 160M, each of which has angled sides. Unlike in FIG. 10A, in FIG. 11A, the sides of the leading-edge pockets 160L, 160M are angled outward, toward the side-edge surfaces 123, 124. Other features shown in FIG. 11A (e.g., features of the ABS 140F) were discussed above in the context of FIG. 4A; that discussion is not repeated here.

Figure 11B:
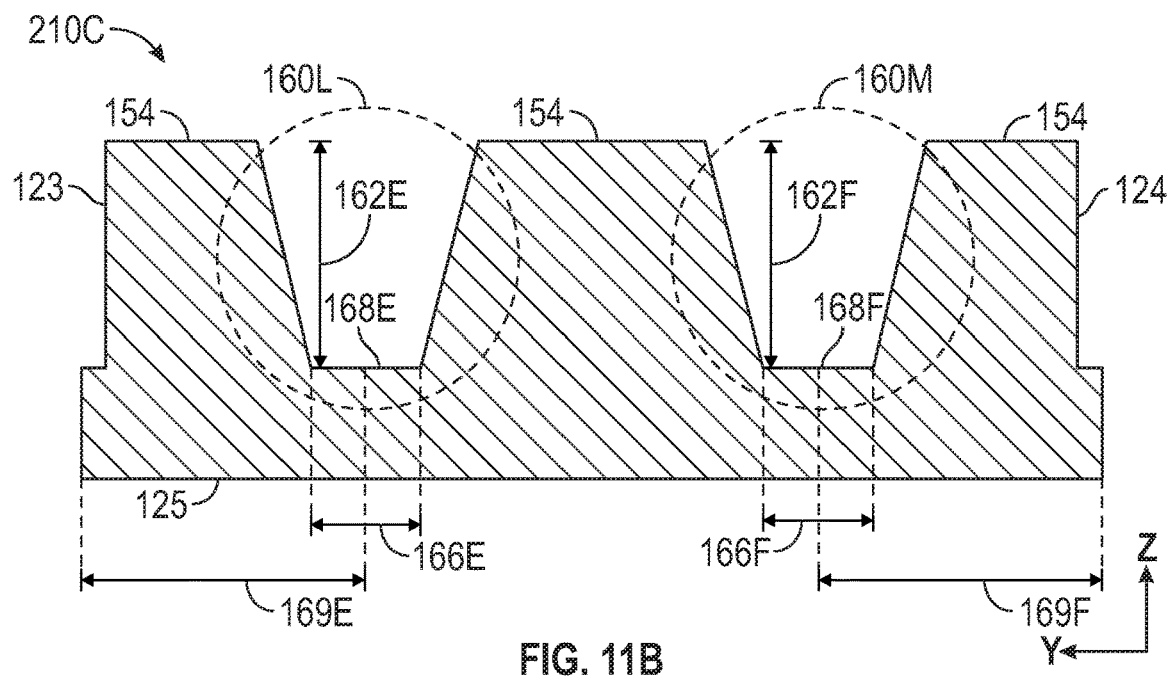
FIG. 11B shows a cross-section of the slider of FIG. 11A.

FIG. 11B shows a cross-section 210C of the slider 525F along the dashed line labeled 11B-11B in FIG. 11A (i.e., taken near the front edges of the first and second side-edge surfaces 123, 124, between the first and second side-edge surfaces 123, 124 and parallel to the leading-edge surface 121 and the trailing-edge surface 122 (i.e., perpendicular to the back-edge surface 125) through the leading-edge pockets 160L, 160M). The cross-section 210C lies in a y-z plane. As shown, the portion of the cross-section 210C that intersects and corresponds to the leading-edge pockets 160L, 160M includes trapezoidal shapes (i.e., the shapes include three of the four sides of a trapezoid). FIG. 11B illustrates isosceles trapezoids, but it is to be understood that the shape need not be isosceles (i.e., the lengths of the sides and/or the sizes of the corresponding angles of the trapezoid may differ from each other). The cross-section 210C includes at least one oblique angle, which happens to be an obtuse angle in FIG. 11B.

The depths of the leading-edge pockets 160L, 160M are at the levels 168E and 168F, respectively. The depths of the leading-edge pockets 160L, 160M are at or below the third level 156. For the leading-edge pocket 160L, the level 168E is a distance 162E below the second level 154. For the leading-edge pocket 160M, the level 168F is a distance 162F below the second level 154. In the embodiment illustrated in FIGS. 11A and 11B, the distances 162E and 162F are substantially equal, but in general they may differ. Likewise, although the levels 168E, 168F of the leading-edge pockets 160L, 160M are shown at the same height, they may differ.

The leading-edge pocket 160L has a width 166E at its narrowest point (i.e., at the base of the trapezoidal portion of the cross-section 210C corresponding to the leading-edge pocket 160L), and the leading-edge pocket 160M has a width 166F at its narrowest point (i.e., at the base of the trapezoidal portion of the cross-section 210C corresponding to the leading-edge pocket 160M). The widths 166E, 166F may be, for example, between approximately 1 µm and 300 µm. As illustrated in FIG. 11B, the widths 166E, 166F are substantially the same. In other embodiments, the widths 166E, 166F may differ.

In the cross-section 210C, the midpoint of the leading-edge pocket 160L is a distance 169E from the side-edge surface 123, and the midpoint of the leading-edge pocket 160M is a distance 169F from the side-edge surface 124. In the exemplary embodiment shown in FIG. 11B, the distances 169E and 169F are substantially equal, but, in general, they may differ. Furthermore, multiple (i.e., two or more) leading-edge pockets 160 may be positioned, uniformly or non-uniformly, along the leading-edge surface 121 to provide the desired flight characteristics for the slider 525F. Each leading-edge pocket 160 may differ from the others in size, shape, and features designed to imbue the slider 525F with the desired characteristics for the environment in which the slider will be deployed (e.g., in a low-ambient-pressure environment, such as a sealed helium drive).

Figure 12A:
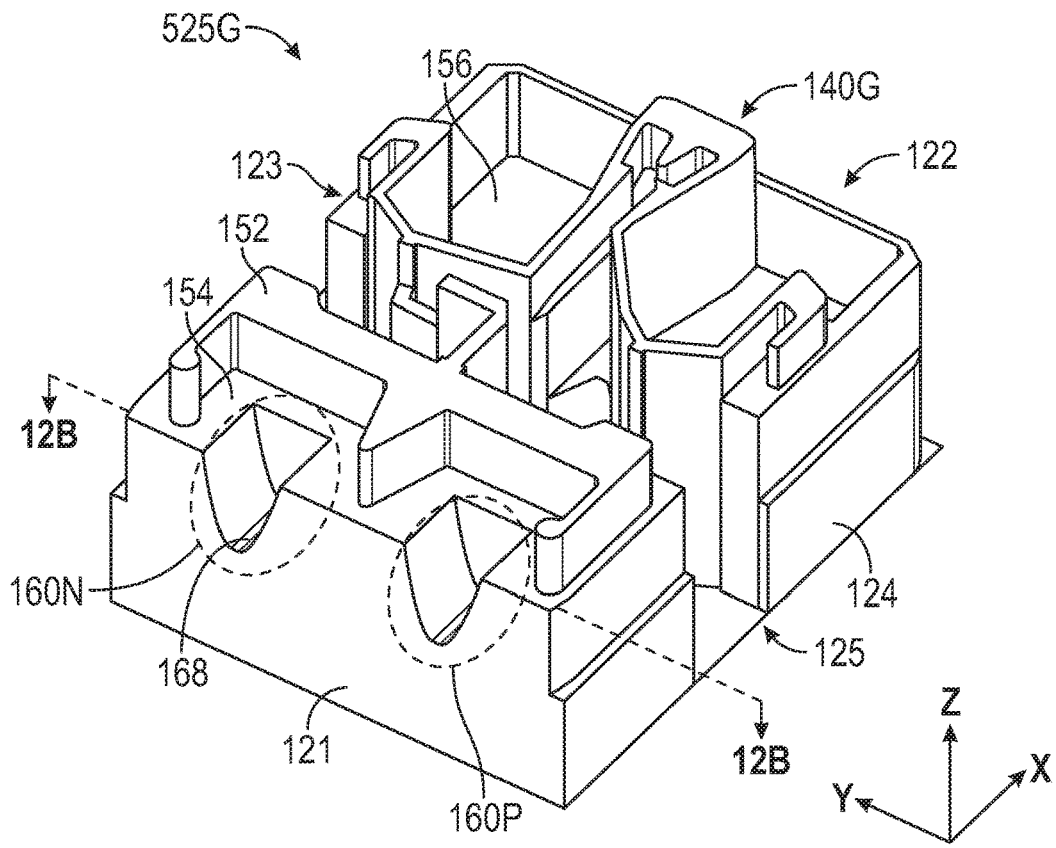
FIG. 12A illustrates an exemplary slider that includes leading-edge pockets with sloped sides in accordance with some embodiments.

FIG. 12A illustrates an exemplary slider 525G that includes leading-edge pockets 160N, 160P, each of which has sloped sides. Other features shown in FIG. 12A (e.g., features of the ABS 140G) were discussed above in the context of FIG. 4A; that discussion is not repeated here.

Figure 12B:
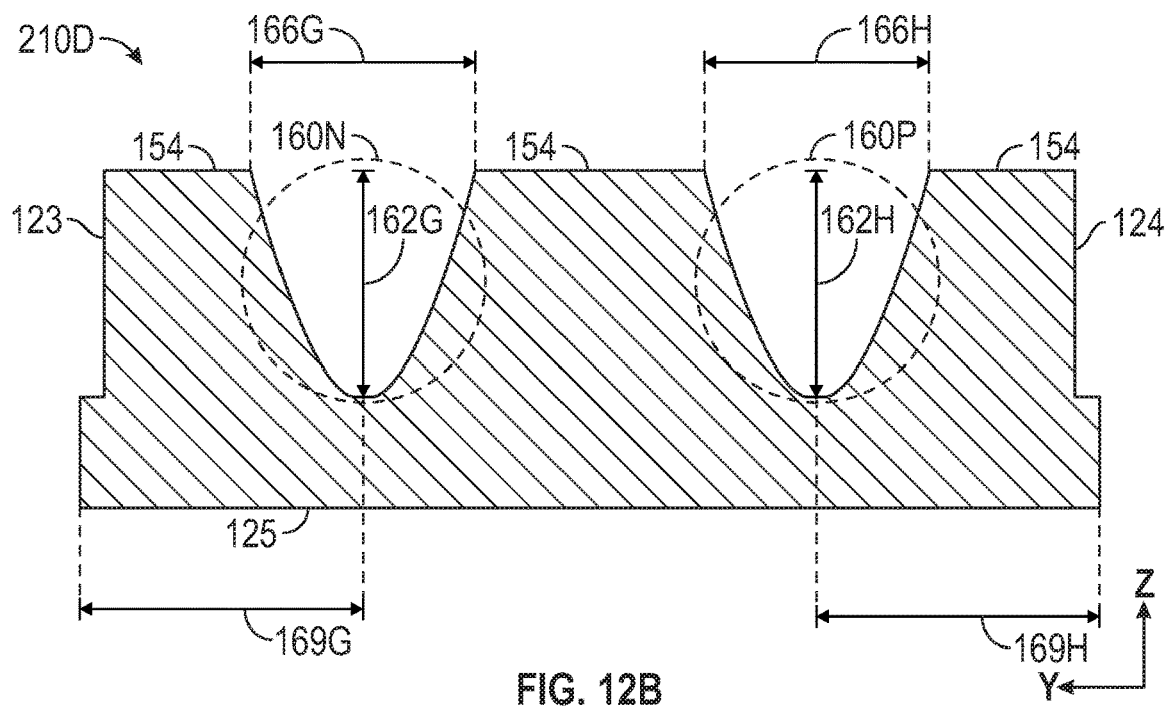
FIG. 12B shows a cross-section of the slider of FIG. 12A.

FIG. 12B shows a cross-section 210D of the slider 525G along the dashed line labeled 12B-12B in FIG. 12A (i.e., taken near the front edges of the first and second side-edge surfaces 123, 124, between the first and second side-edge surfaces 123, 124 and parallel to the leading-edge surface 121 and the trailing-edge surface 122 (i.e., perpendicular to the back-edge surface 125) through the leading-edge pockets 160N, 160P). The cross-section 210D lies in a y-z plane. As shown, the portion of the cross-section 210D that intersects and corresponds to the leading-edge pockets 160N, 160P includes an arc or curve. In the exemplary embodiment of FIG. 12B, the cross-section 210D includes shapes resembling parabolas at the locations where the cross section 210D intersects the leading-edge pockets 160N, 160P.

The maximum depth of the leading-edge pocket 160N is a distance 162G below the second level 154 and is at or below the third level 156. The maximum depth of the leading-edge pocket 160P is a distance 162H below the second level 154 and is at or below the third level 156. In the embodiment illustrated in FIGS. 12A and 12B, the distances 162G and 162H are substantially equal, but in general they may differ. Likewise, although the shapes of the leading-edge pockets 160N, 160P are illustrated as being approximately the same, in general they may differ (e.g., one may have a more severe or a gentler slope than the other). Furthermore, one or both of the leading-edge pockets 160N, 160P may include a flat (or non-flat) horizontal region between the sloped sides.

The leading-edge pocket 160N has a width 166G at its widest point (i.e., as shown in FIG. 12B, where the leading-edge pocket 160N intersects the second level 154), and the leading-edge pocket 160P has a width 166H at its widest point (i.e., where the leading-edge pocket 160P intersects the second level 154). The widths 166G, 166H may be, for example, between approximately 1 µm and 300 µm. It is to be understood that the maximum width of each of the leading-edge pockets 160N, 160P may be somewhere other than where the leading-edge pocket 160N, 160P intersects the second level 154. For example, the leading-edge pockets 160N, 160P could have teardrop shapes instead of parabolic shapes. As illustrated in FIG. 12B, the widths 166G, 166H are substantially the same. In other embodiments, the widths 166G, 166H may differ. It should be appreciated that the widths of the leading-edge pockets 160N, 160P along the y-axis will depend on the location along the z-axis.

In the cross-section 210D, the midpoint of the leading-edge pocket 160N is a distance 169G from the side-edge surface 123, and the midpoint of the leading-edge pocket 160P is a distance 169H from the side-edge surface 124. In the exemplary embodiment shown in FIG. 12B, the distances 169G and 169H are substantially equal, but, in general, they may differ. Furthermore, multiple (i.e., two or more) leading-edge pockets 160 may be positioned, uniformly or non-uniformly, along the leading-edge surface 121 to provide the desired flight characteristics for the slider 525G. Each leading-edge pocket 160 may differ from the others in size, shape, and features designed to imbue the slider 525G with the desired characteristics for the environment in which the slider will be deployed (e.g., in a low-ambient-pressure environment, such as a sealed helium drive).

Figure 13A:
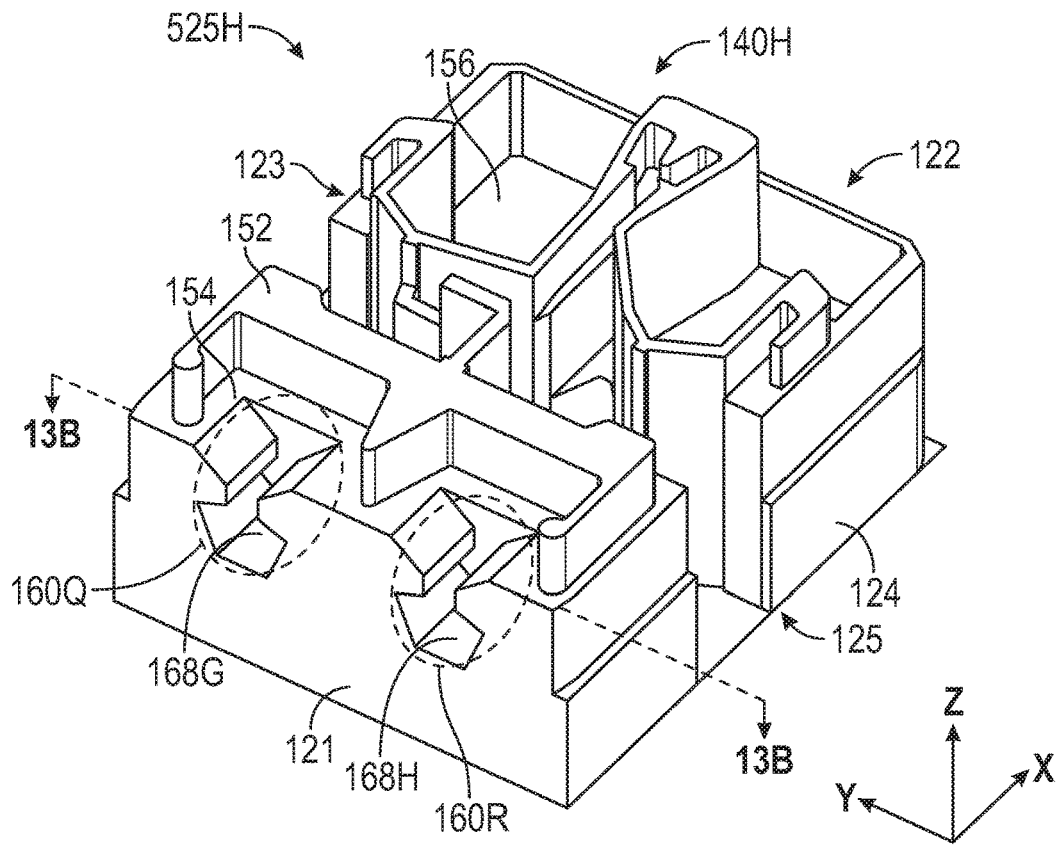
FIG. 13A illustrates an exemplary slider that includes leading-edge pockets with at least one protrusion in accordance with some embodiments.

FIG. 13A illustrates an exemplary slider 525H that includes leading-edge pockets 160Q, 160R, each of which has a non-uniform shape that includes a protrusion. Other features shown in FIG. 13A (e.g., features of the ABS 140H) were discussed above in the context of FIG. 4A; that discussion is not repeated here.

Figure 13B:
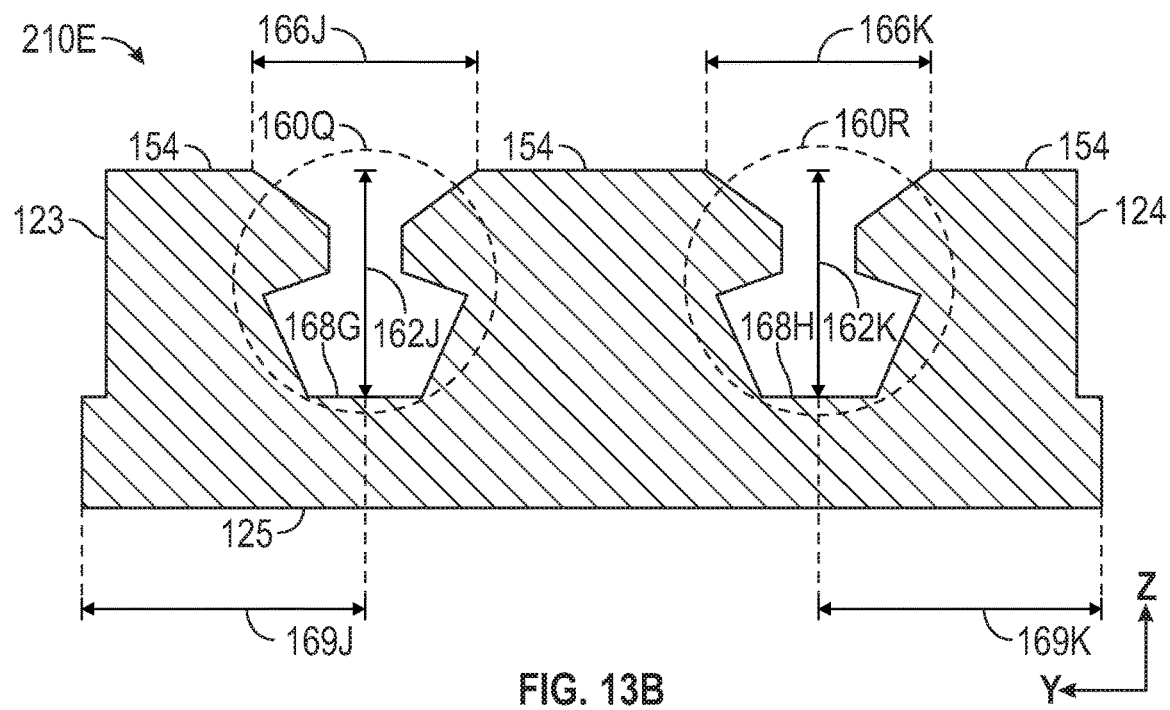
FIG. 13B shows a cross-section of the slider of FIG. 13A.

FIG. 13B shows a cross-section 210E of the slider 525H along the dashed line labeled 13B-13B in FIG. 13A (i.e., taken near the front edges of the first and second side-edge surfaces 123, 124, between the first and second side-edge surfaces 123, 124 and parallel to the leading-edge surface 121 and the trailing-edge surface 122 (i.e., perpendicular to the back-edge surface 125) through the leading-edge pockets 160Q, 160R). The cross-section 210E lies in a y-z plane. As shown, the portion of the cross-section 210E that intersects and corresponds to the leading-edge pockets 160Q, 160R includes at least one protrusion. For example, the portion of the cross-section 210E that intersects the leading-edge pocket 160Q includes two protrusions, one extending away from the side-edge surface 123 and another extending toward the side-edge surface 123. Likewise, the portion of the cross-section 210E that intersects the leading-edge pocket 160R includes one protrusion extending away from the side-edge surface 124 and another protrusion extending toward the side-edge surface 124.

The maximum depth of the leading-edge pocket 160Q is at a level 168G, which is a distance 162J below the second level 154. The level 168G is at or below the third level 156. The maximum depth of the leading-edge pocket 160R is at a level 168H, which is a distance 162K below the second level 154. The level 168H is at or below the third level 156. In the embodiment illustrated in FIGS. 13A and 13B, the distances 162J and 162K are approximately equal, but in general they may differ. Likewise, the levels 168G and 168H shown in FIG. 13B are illustrated as being approximately equal, but in general they may differ as well. Moreover, although the shapes of the leading-edge pockets 160Q, 160R are illustrated as being substantially the same, in general they may differ.

The leading-edge pocket 160Q has a width 166J at its widest point (i.e., for the particular shape shown in FIGS. 13A and 13B, where the leading-edge pocket 160Q intersects the second level 154), and the leading-edge pocket 160R has a width 166K at its widest point (i.e., for the particular shape shown in FIGS. 13A and 13B, where the leading-edge pocket 160R intersects the second level 154). The widths 166J, 166K may be, for example, between approximately 1 µm and 300 µm. As illustrated in FIG. 13B, the widths 166J, 166K are substantially the same. In other embodiments, the widths 166J, 166K may differ. Moreover, the maximum widths 166J, 166K may be at a different location than where the leading-edge pockets 160Q, 160R intersect the second level 154, depending on the features of the leading-edge pockets 160Q, 160R. It should be appreciated that because the leading-edge pockets 160Q, 160R include protrusions, their widths along the y-axis will depend on the location along the z-axis.

In the cross-section 210E, the midpoint of the leading-edge pocket 160Q is a distance 169J from the side-edge surface 123, and the midpoint of the leading-edge pocket 160R is a distance 169K from the side-edge surface 124. In the exemplary embodiment shown in FIG. 13B, the distances 169J and 169K are substantially equal, but, in general, they may differ. Furthermore, multiple (i.e., two or more) leading-edge pockets 160 may be positioned, uniformly or non-uniformly, along the leading-edge surface 121 to provide the desired flight characteristics for the slider 525H. Each leading-edge pocket 160 may differ from the others in size, shape, and features designed to imbue the slider 525H with the desired characteristics for the environment in which the slider will be deployed (e.g., in a low-ambient-pressure environment, such as a sealed helium drive).

Conventionally, a slider 525 is fabricated from a wafer using a photolithography process having two steps: (a) covering a portion of a surface of the wafer, and (b)

removing substrate material from the exposed (i.e., not covered) surface of the wafer. Step (a) may be accomplished, for example, using a binary mask having hard edges to create a well-defined pattern in a photoresist layer that is applied to the wafer surface. Step (b) may be accomplished, for example, by lapping, etching, or milling (e.g., using an ion beam) to transfer the photoresist pattern to the wafer surface. The surface of the slider 525 to which the covering is applied and from which material is removed is the surface that will eventually face the disk 520 when the slider 525 is used in a disk drive 500, i.e., the ABS 140. The steps (a) and (b) may be repeated multiple times to create different slider features.

In some embodiments, the at least one leading-edge pocket 160 disclosed herein may be fabricated using conventional techniques. Specifically a leading-edge pocket 160, such as the exemplary leading-edge pockets 160 illustrated in FIGS. 4A-4C, 6A-6B, 8A-8B, 9A, 11A-12B, may be etched out by milling (e.g., deep ion milling) using the steps (a) and (b) discussed above. The use of conventional slider fabrication techniques may be desirable to add the at least one leading-edge pocket 160 to a slider without increasing its manufacturing cost or complexity. Other fabrication techniques may be used instead or in addition to fabricate more complex or different types of leading-edge pockets 160 (e.g., the exemplary leading-edge pockets 160 illustrated in FIGS. 7A-7B, 9B, 9C, 10A-10B, 13A-13B). For example, U.S. patent application Ser. No. 15/164,817, filed May 25, 2016, discloses methods for manufacturing sliders using additive fabrication techniques (e.g., three-dimensional (3D) printing, stereo lithography, fused deposition modeling, selective laser sintering, multi-jet modeling, etc.) to form slider features. These methods and techniques may be used to create a slider 525 having the at least one leading-edge pocket 160 disclosed herein. The contents of U.S. patent application Ser. No. 15/164,817, filed May 25, 2016, are hereby incorporated by reference in their entirety.

As explained previously, the drawings herein illustrate the exemplary sliders 525 with the ABS 140 oriented upward. For ease of explanation, this document adopts the convention of illustrating and describing the slider 525 with the ABS facing upward. With the slider 525 so oriented, the first level 152 is illustrated and described as being "above" the second and third levels 154, 156, and the level 168; the second level 154 is illustrated and described as being "below" the first level 152 and "above" the third level 156 and the level 168; the third level 156 is illustrated and described as being "below" the first and second levels 152 and 154 and "at or above" the level 168; and the level 168 is illustrated and described as being "below" the first and second levels 152, 154, and "at or below" the third level 156. Of course, when the slider 525 is installed in a data storage device, such as a disk drive 500, the ABS 140 will be oriented downward, toward the recording medium (e.g., disk 520). Consequently, the first level 152 will be the level closest to the disk 520, making it the lowest level, and the levels 154, 156, and 168 will be progressively further away from the disk 520. (Of course, when the level 168 is at the third level 156, the level 168 and the third level 156 will be the same distance from the disk 520.)

In addition, although the drawings herein that show more than one leading-edge pocket 160 illustrate identical leading-edge pockets 160, as explained previously, it is to be understood that when a slider 525 includes more than one leading-edge pocket 160, those leading-edge pockets 160 need not be identical or even similar. For example, different leading-edge pockets 160 of the same slider 525 may have different sizes (e.g., height, width, depth) and/or shapes (e.g., one leading-edge pocket 160 may be rectangular and another parabolic/curved) and/or features (e.g., one leading-edge pocket 160 may include a cavity or protrusion and another may not; one leading-edge pocket 160 may be sloped and another not; etc.). In general, each leading-edge pocket 160 may have a unique size, shape, and features, all of which may be selected to imbue the slider 525 with the desired performance characteristics (e.g., fly height, stability, etc.). Moreover, multiple leading-edge pockets 160 need not be symmetrically positioned about the center (in the y direction) of the leading-edge surface 121 or uniformly distributed along the leading-edge surface 121. Furthermore, although many of the drawings herein illustrate sliders 525 with exactly two leading-edge pockets 160, a slider 525 may include more than two leading-edge pockets 160, or it may include only one leading-edge pocket 160.

In addition, although many of the drawings herein illustrate leading-edge pockets 160 with smooth levels 168 and smooth sides, in general any surface of the at least one leading-edge pocket 160 may be smooth, rough, or textured. Likewise, although many of the drawings herein illustrate leading-edge pockets 160 with horizontal levels 168, the levels 168 need not be horizontal or flat. Specifically, the levels 168 may be sloped toward or away from the leading-edge surface 121, and/or they may slope upward or downward between the side-edge surface 123 and the side-edge surface 124.

It is to be understood that combinations of the features and properties of leading-edge pockets 160 described herein are specifically contemplated. For example, a particular leading-edge pocket 160 may include a parabolic/curved/arced shape (e.g., FIGS. 12A, 12B) with a backward slope (e.g., FIGS. 6A, 6B, 8A, 8B) and one or more cavities (e.g., FIG. 9B) or protrusions (e.g., FIGS. 9C, 13A, 13B), with various surfaces that may be smooth (various drawings) or non-uniform (e.g., FIG. 9A). Skilled artisans will recognize that the disclosures herein enable a wide variety of design combinations and options to improve slider 525 performance in lower-ambient-pressure environments. Based on the disclosures herein, persons having ordinary skill in the art will understand how to design sliders 525 with at least one leading-edge pocket 160.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

As set forth herein, as used to describe the relative positions of different layers of a slider ABS, the terms "above," "below," "higher," and "lower" are used assuming that the ABS of the slider is facing up.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A slider for a data storage device, the slider comprising:
   an air-bearing surface (ABS);
   a leading-edge surface; and
   at least one leading-edge pocket in the leading-edge surface, wherein the at least one leading-edge pocket includes an interior surface that is substantially parallel to the leading-edge surface, and wherein a cross-section of the slider taken parallel to the leading-edge surface and intersecting the at least one leading-edge pocket has at least one nonlinear side with an arc or curved region.

2. The slider recited in claim 1, wherein the at least one leading-edge pocket comprises a first pocket and a second pocket, and wherein the first and second pockets are substantially identical.

3. The slider recited in claim 1, wherein, in an orientation in which the ABS is oriented upward, a depth of the at least one leading-edge pocket relative to a highest level of the ABS is greater than about 2.5 µm.

4. The slider recited in claim 1, wherein at least a portion of the cross-section of the slider taken parallel to the leading-edge surface and intersecting the at least one leading-edge pocket has a shape of at least a portion of a parabola.

5. The slider recited in claim 1, wherein a maximum width of the at least one leading-edge pocket is between approximately 1 µm and approximately 300 µm.

6. A data storage device comprising the slider recited in claim 1.

7. A slider for a data storage device, the slider comprising:
   a first side-edge surface;
   a second side-edge surface;
   a leading-edge surface extending between a front edge of the first side-edge surface and a front edge of the second side-edge surface;
   a back-edge surface;
   an air-bearing surface (ABS) having at least a first level, a second level, and a third level, wherein, in an orientation in which the ABS is oriented upward, the first level is above the second level, and the second level is above the third level, and the third level is above the back-edge surface; and
   at least one leading-edge pocket in the leading edge surface, the at least one leading-edge pocket not intersecting either the first side-edge surface or the second side-edge surface, wherein, in the orientation in which the ABS is oriented upward, a maximum depth of the at least one leading-edge pocket is at or below the third level,
   wherein a cross-section of the slider intersecting the at least one leading-edge pocket and taken between the first side-edge surface and the second side-edge surface and parallel to the leading-edge surface comprises an arc or a curve in a region of the cross-section intersecting the at least one leading-edge pocket.

8. The slider recited in claim 7, wherein a shape of the at least one leading-edge pocket in the cross-section of the slider is substantially parabolic.

9. The slider recited in claim 7, wherein a shape of the at least one leading-edge pocket in the cross-section of the slider is symmetric about an axis extending from the maximum depth of the at least one leading-edge pocket to the second level, the axis being parallel to the leading-edge surface.

10. The slider recited in claim 7, wherein the cross-section of the slider further comprises a flat portion in a region of the cross-section intersecting the at least one leading-edge pocket.

11. The slider recited in claim 7, wherein a distance between the first level and the third level is between approximately 0.35 µm and approximately 5.2 µm.

12. The slider recited in claim 7, wherein a distance between the first level and the third level is greater than about 2.5 µm.

13. The slider recited in claim 7, wherein a maximum width of the at least one leading-edge pocket is between approximately 1 µm and approximately 300 µm.

14. The slider recited in claim 7, wherein the at least one leading-edge pocket comprises a first leading-edge pocket and a second leading-edge pocket, and wherein a midpoint of a width of the first leading-edge pocket at the second level is a first distance from the first side-edge surface, and a midpoint of a width of the second leading-edge pocket at the second level is a second distance from the second side-edge surface, wherein the first distance is substantially equal to the second distance.

15. The slider recited in claim 14, wherein the first and second leading-edge pockets are substantially identical.

16. The slider recited in claim 7, wherein the at least one leading-edge pocket comprises a first leading-edge pocket and a second leading-edge pocket, and wherein a maximum width of the first leading-edge pocket is substantially equal to a maximum width of the second leading-edge pocket.

17. The slider recited in claim 7, wherein the at least one leading-edge pocket comprises a first leading-edge pocket and a second leading-edge pocket, wherein the first and second leading-edge pockets are substantially identical, and wherein a distance between the first level and the third level is greater than about 2.5 µm.

18. The slider recited in claim 17, wherein a maximum width of each of the first and second leading-edge pockets is between approximately 100 µm and approximately 300 µm.

19. A data storage device comprising the slider recited in claim 7.

* * * * *